United States Patent
Zhou et al.

(10) Patent No.: US 11,023,896 B2
(45) Date of Patent: Jun. 1, 2021

(54) SYSTEMS AND METHODS FOR REAL-TIME PROCESSING OF DATA STREAMS

(71) Applicant: Coupang Corp., Seoul (KR)

(72) Inventors: Yan Zhou, San Jose, CA (US); Yonghui Chen, San Diego, CA (US)

(73) Assignee: Coupang, Corp., Seoul (KR)

( * ) Notice: Subject to any disclaimer, the term of this patent is extended or adjusted under 35 U.S.C. 154(b) by 0 days.

(21) Appl. No.: 16/447,904

(22) Filed: Jun. 20, 2019

(65) Prior Publication Data

US 2020/0402058 A1 Dec. 24, 2020

(51) Int. Cl.
*G06Q 20/40* (2012.01)
*G06N 3/04* (2006.01)
*G06F 9/54* (2006.01)
*G06F 16/2455* (2019.01)
*G06F 17/15* (2006.01)

(52) U.S. Cl.
CPC .......... *G06Q 20/4016* (2013.01); *G06F 9/54* (2013.01); *G06F 16/24568* (2019.01); *G06F 17/15* (2013.01); *G06N 3/0472* (2013.01)

(58) Field of Classification Search
CPC . G06Q 20/4016; G06F 16/24568; G06F 9/54; G06F 17/15; G06N 3/0472
See application file for complete search history.

(56) References Cited

U.S. PATENT DOCUMENTS

| | | | |
|---|---|---|---|
| 7,606,895 B1 | 10/2009 | Dini et al. | |
| 8,805,737 B1* | 8/2014 | Chen | G06Q 40/02 705/38 |
| 9,734,220 B2 | 5/2017 | Karpistsenkop et al. | |
| 9,992,248 B2 | 6/2018 | Fox et al. | |
| 2006/0059568 A1 | 3/2006 | Smith-Mickelson et al. | |
| 2012/0158586 A1* | 6/2012 | Ganti | G06Q 20/405 705/44 |
| 2012/0221161 A1 | 8/2012 | Billingsley et al. | |
| 2013/0024358 A1* | 1/2013 | Choudhuri | G06Q 20/4016 705/38 |

(Continued)

OTHER PUBLICATIONS

Thein, Khin Me Me, "Apache Kafka: Next Generation Distributed Messaging System", International Journal of Scientific Engineering and Technology Research, www.ijsetr.com, vol. 02, Issue 47, Dec. 2014, pp. 9478-9483.

(Continued)

*Primary Examiner* — Alexey Shmatov
*Assistant Examiner* — Tri T Nguyen
(74) *Attorney, Agent, or Firm* — Finnegan, Henderson, Farabow, Garrett & Dunner LLP

(57) ABSTRACT

A system for generating alerts including processors and storage devices. The instructions configure the one or more processors to perform operations, which include receiving an event from a data stream, extracting keys from the event, associating the event with at least one account based on the extracted keys, identifying a state variable associated with the at least one account, updating the state variable by accumulating the event in the state variable, registering a time stamp for the event in the state variable, and retiring expired events from the state variable. The operations may also include determining whether the state variable is above a threshold level and generating an alert for the account when the state variable is above the threshold level.

20 Claims, 20 Drawing Sheets

(56) References Cited

U.S. PATENT DOCUMENTS

| | | | |
|---|---|---|---|
| 2013/0290187 A1* | 10/2013 | Itwaru | G06Q 20/3227 |
| | | | 705/44 |
| 2015/0073949 A1* | 3/2015 | Armstrong | G06Q 40/12 |
| | | | 705/30 |
| 2015/0073981 A1* | 3/2015 | Adjaoute | G06Q 30/0225 |
| | | | 705/39 |
| 2015/0161609 A1* | 6/2015 | Christner | G06Q 20/4016 |
| | | | 705/44 |
| 2015/0199214 A1 | 7/2015 | Lee et al. | |
| 2015/0339673 A1* | 11/2015 | Adjaoute | G06F 16/283 |
| | | | 705/30 |
| 2017/0078322 A1 | 3/2017 | Seiver et al. | |
| 2017/0178135 A1* | 6/2017 | Bull | G06Q 10/1057 |
| 2017/0206557 A1 | 7/2017 | Abrol et al. | |
| 2018/0091588 A1 | 3/2018 | Qin et al. | |
| 2018/0152358 A1 | 5/2018 | Chheda et al. | |
| 2018/0293584 A1* | 10/2018 | Maheshwari | G06Q 20/4016 |
| 2019/0005484 A1* | 1/2019 | Mohsenzadeh | G06Q 20/227 |
| 2019/0130407 A1* | 5/2019 | Adjaoute | G06Q 20/4016 |
| 2020/0111099 A1* | 4/2020 | Benkreira | G06Q 20/4014 |

OTHER PUBLICATIONS

Kreps, Jay, Neha Narkhede, and Jun Rao. "Kafka: A distributed messaging system for log processing." In Proceedings of the NetDB, pp. 1-7. 2011.

International Search Report and Written Opinion of the International Searching Authority dated Jul. 30, 2020 for corresponding International Application No. PCT/US2020/029306. (9 pages).

* cited by examiner

SYSTEMS AND METHODS FOR REAL-TIME PROCESSING OF DATA STREAMS

TECHNICAL FIELD

The present disclosure relates generally to systems and methods for real-time data stream processing, and more particularly, to systems and methods for processing historic trends in multi-sourced data streams to identify anomalies, while minimizing required resources, latency, and/or memory utilization.

BACKGROUND

In some networked systems data is exchanged between different servers—or domains—in data streams, which may be sequences of digitally encoded signals such as data packets transmitted frequently or continuously. Real-time processing of information in data streams (i.e., processing data as soon as it becomes available to the system) provides the ability to quickly respond to new information and react without delay. In other words, real-time data processing of data streams allows the users of networked systems to get insights or draw conclusions very rapidly based on immediate or very recent data.

The ability to process data streams in real-time is valuable in several applications. For example, systems monitoring patients' health can gain critical insights on a patient's condition by monitoring and processing diagnostic data in real-time. Also, data servers may capture anomalies in a data stream to identify attacks, such as DOS attacks, by monitoring client requests in real-time. Similarly, by processing data streams in real-time, credit card companies or online retailers may identify and prevent fraudulent activity. Moreover, real-time processing of data streams can be useful in customer relationship management (CRM). Overall, processing data streams in real-time permits a stricter control of networks, creates more robust systems, and enables applications that require immediate reaction.

Processing data streams in real-time, however, has technical challenges that limit its effective implementation. Particularly in complex systems, like those with multiple information providers, several data streams, or very large amount of data, real-time analysis of data streams can be computationally complex and resource intensive. For example, a real-time processing system face the technical challenge of providing high availability and low response times. Also real-time processing systems face the challenge of handling large amounts of data, with some applications even demanding processing of terabytes of information per minute, while also returning answers quickly. Moreover, for real-time processing systems face challenges of data disparity because they may receive data from multiple sources with different data formats.

These technical challenges or issues get compounded in applications that look at historic data to arrive to identify trends or infer conclusions. In such applications the real-time face the challenge of processing data quickly, while—at the same time—managing complex memory operations to retrieve information required for analysis and store information quickly after the analysis. Providing meaningful conclusions demands a real-time processing system that should have the ability to quickly read and write memory units, quickly storing newly processed information, and retrieving previous information that is needed for current conclusions.

To tackle the technical challenges for successful real-time data stream processing, systems may employ complex and expensive hardware architecture with very robust computing capabilities that can cope with the processing demands. Many of these processes are, therefore, reserved for complex computer clusters or networked services that have high bandwidth and processing ability. These systems are also configured with complex memory management systems to retrieve and store data quickly. These resources, however, are expensive to maintain and are not available for all applications.

The disclosed systems and methods for providing multimedia content to client devices address one or more of the problems set forth above and/or other problems in the prior art.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

SUMMARY

Figure 1:
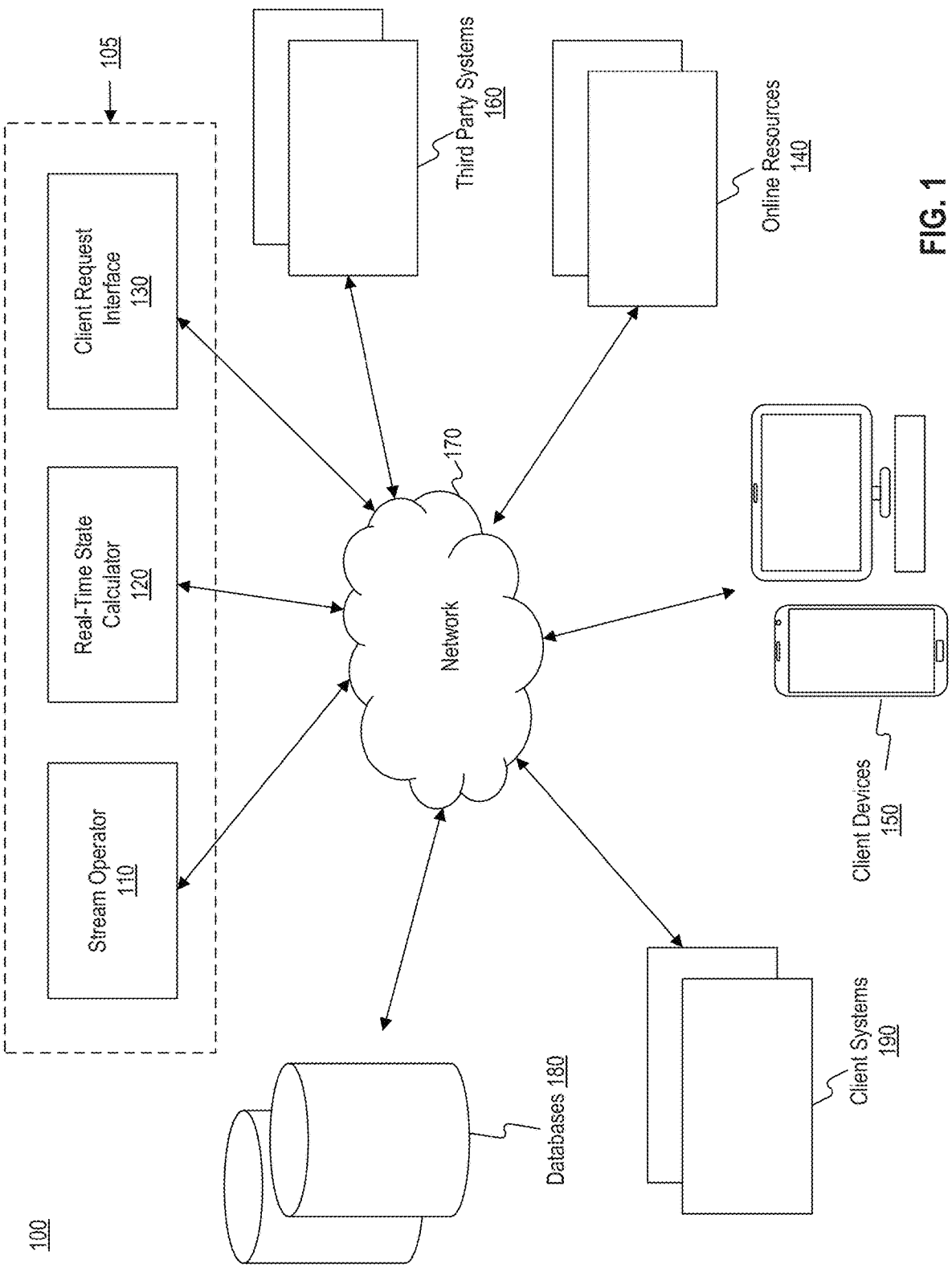
FIG. 1 is a block diagram of an exemplary system, consistent with disclosed embodiments.

One aspect of the present disclosure is directed to a system for generating alerts. The system may include one or more processors and one or more storage devices storing instructions. When executed, the instructions may configure the one or more processors to perform operations. The operations may include receiving an event from a data stream, the event including transaction information, extracting keys from the event based on a group of pre-defined selected topics, associating the event with at least one account based on the extracted keys, and identifying a state variable associated with the at least one account, the state variable being configured to be accessible with constant time complexity. Further, the instructions may include operations of updating the state variable by accumulating the event in the state variable, registering a time stamp for the event in the state variable, and retiring expired events from the state variable, determining whether the state variable is above a threshold level, and generating an alert for the account when the state variable is above the threshold level.

Another aspect of the present disclosure is directed to a computer-implemented method for generating alerts. The method may include receiving an event from a data stream, the event including transaction information, extracting keys from the event based on a group of pre-defined selected topics, associating the event with at least one account based on the extracted keys, identifying a state variable associated with the at least one account, the state variable being configured to be accessed with a constant time complexity. The method may also include updating the state variable by accumulating the event in the state variable, registering a time stamp for the event in the state variable, and retiring expired events from the state variable. The method may also include determining whether the state variable is above a threshold level and generating an alert for the account when the state variable is above the threshold level.

Yet another aspect of the present disclosure is directed to a non-transitory computer-readable medium storing instructions. When executing the instructions, a processor perform operations to generate real-time alerts based on transactions including: receiving, from a plurality of client systems, a data stream including a plurality of events, filtering out events from the plurality of events that do not include a time stamp, generating an array of normalized events by normalizing time zone and currency in each one of the non-filtered events. The operations may also include extracting in real-time a plurality of keys from the normalized events, the plurality of keys including IP address, email address, or phone number, associating the normalized events with at least one account based on corresponding keys, identifying state variables associated with corresponding accounts, the state variables being configured to be accessible with O(1) complexity operators, the state variables being stored in a single copy, updating the state variables by accumulating the non-filtered events in the state variables, registering a timer and a callback for each one of the updated state variables, retiring expired events from the state variable, the expired events having a time stamp that fall outside a time window; assigning weights to updated state variables associated with an account; computing a probability of fraud using a predictive model based on the updated variables; and generating an alert for the account when the state variable is above the threshold level.

DETAILED DESCRIPTION

The disclosure is generally directed to systems and methods for real-time processing of data streams that may minimize latency and reduce the number of memory operations. For example, in some embodiments the disclosed systems may employ accumulation state variables configured to be accessed with low complexity functions to reduce response time and memory utilization. Further, the disclosed systems and methods may process historic trends and multiple related events using predictive models that improve accuracy of conclusions. In such embodiments, a plurality of predictive models may use as input multiple state variables (covering a plurality of considerations) to obtain a more precise determination based on both historic data and multiple datasets. For example, when used for electronic payment fraud detection, the disclosed systems may use multiple state variables to monitor independently variables like transaction frequency, transaction amount, transaction location, transaction merchant, or transaction currency. With such diversity of considerations, but quick response based on low complexity operations, conclusions and calculations of fraud may be highly accurate.

Moreover, the disclosed system and methods may employ an incremental architecture that uses differential computations, instead of absolute determination, to enhance real-time processing performance. In such embodiments, employing differential computations may reduce the hardware requirements and minimize latency of response. For instance, disclosed systems may be implemented with simple differential logic and a parallelized architecture to rapidly analyze variables independently. Such arrangement improves computer operation and functionality by facilitating real-time efficient data processing.

Further, the disclosed systems and methods may relax hardware requirements for real-time data stream processing by limiting the number of calculations required to consider each event. For example, instead of performing multiple calculations to consider historic trends in a data stream, the disclosed systems and methods may be configured to perform two calculations only for each event in the data stream; one when the event occurs and one when the event expires. A differential architecture may enable the disclosed systems to limit the number of calculations for each event, reduce the complexity of the system, and minimize computer resources devoted to monitoring the data streams.

Alternatively, or additionally, the disclosed systems and methods may reduce computational requirements by avoiding continuous calculations based on historical information. Instead of constantly or periodically calculating variables and generating predictions, in the disclosed systems and methods calculations may only be triggered when a relevant event (i.e., a triggering event) in a data stream is received. This approach of engaging with calculation engines only when an event is received, saves resources and solves technical difficulties related to hardware utilization. For example, embodiments directed to identifying suspicious activity or fraud may be configured to only "wake up" or get engaged when receiving a triggering event, instead of applying a decay function and periodic calculations, to reduce computer utilization. Moreover, by employing dynamic state variables able to react in real time, the disclosed systems and methods calculations may minimize memory utilization. In such embodiments, the disclosed systems and methods may quickly update variables, as soon as events are received or expire. Such arrangement for updating state variables may minimize latency because they may reduce operations related to sliding intervals and periodic calculations.

Moreover, the disclosed systems and methods may be well-suited to handle complex and long-term analysis of data streams. When handling historic trends of data streams, real-time processing systems may face long latency or performance issues—particularly analyzing long historic trends that require complex computations. In the disclosed systems and methods, however, the use of state variables with low complexity and a differential architecture may solve technical issues. Configuring variables and functions used for real-time analysis to have low time complexity may result in a system with a response time that is independent of the analyzed trend. Indeed, in some implementations of the disclosed systems and methods variables and function may be configured to have an uniform O(1) complexity that determines a quick response to processing requests regardless of the historic trend term. Thus, in some embodiments of the disclosed methods and systems, arranging data structures for state variables to be accessed with low complexity operators, enable processing events in incoming data streams in merely milliseconds, regardless of the complexity of the historic analysis.

Some embodiments of the disclosed systems and methods may also improve the technical field of real-time data stream monitoring by minimizing the hardware required for storing processed data. For example, in some embodiments the disclosed method may be configured to store a single copy of the analyzed data while removing older data, simplifying memory structures required in the system. Alternatively, or additionally, the disclosed systems and methods may use memory storage architectures tailored for real-time processing. For example, the disclosed systems may include first-in and first-out registers, or similar memory structures, to efficiently handle stored data while minimizing the required storage space for the predictions and/or future calculations. Moreover, in some embodiments of the disclosed systems and methods, calculations and determinations related to data streams may be stored on a single physical or virtual disk to minimize access latency and memory utilization.

Furthermore, the disclosed systems and methods may include embodiments in which time gaps are not tracked to simplify models and reduce memory utilization. Instead of tracking time for each event analyzed in the data stream, in the disclosed methods no time gap is stored for time decay functions but, rather, only the event and entry time is used to consider or not, as a binary function, the influence of events in the data stream on state variables.

Moreover, the disclosed systems and methods may be configured to generate consistent results between on-line and off-line implementations. Off-line implementations are executed within local devices or systems without being connected to outside networks or domains. Testing or implementing models and/or protocols for real-time capture in off-line operation may be simpler and faster. For example, managing information and data flows may be simpler in off-line implementations because a user has complete control of data destined for analysis or training event capture models. Further, in off-line implementations users can normally integrate and/or deactivate other modules quickly within the local system. Off-line implementations, however, may be locked and cannot export trained models. Further, off-line implementations require setting up individual storage or processing capabilities, such as an SQL service. In contrast, on-line implementations are executed with networked devices and the system may incorporate real-time data generated by other elements of the system. For example, on-line implementations may be executed within cloud services or "live" systems connected to real-time client information streams. On-line implementations may be flexible, allowing users to experiment with different types of software and training information. On-line implementations may also remove the requirement of dedicated computer hardware. Having consistency between off-line and on-line implementations, allows developers to seamlessly integrate new features on the implementation, develop in a protected environment, and correct issues with faster iterations. The disclosed systems and methods may facilitate consistent off-line and on-line transitions.

For example, the disclosed systems may generate similar, or substantially similar results, when analyzing data streams off-line and on-line. The disclosed methods may be configurable to develop and train predictive models off-line that can be used in on-line applications seamlessly. Having consistency between off-line and on-line behaviors of the system may facilitate model building and model implementations. With the disclosed systems and methods being interchangeably executed, the disclosed systems and methods solve technical problems of incompatibility between off-line and on-line performance of predictive models.

The disclosed systems and methods may also solve technical issues of processing multi-sourced information in real-time. For example, the disclosed systems may include filters in specific locations or data modifiers that normalize data before it is processed. In such embodiments, the disclosed methods may include screening data streams by a pre-coded filter to identify events that do not need to be processed or that fall outside a category required by the user. Such filters may be positioned in the interface between domains or servers to facilitate later real-time processing.

In some implementations, the disclosed systems and methods may improve the technical field of automated electronic payment fraud detection. For example, the disclosed systems and methods may be applicable to data streams with data transactions to capture when a user performs high frequency transactions in a short amount of time. For such applications, the disclosed systems and methods may process transaction information in real-time and calculate frequency, origin, and amount of transactions quickly, and accurately. Further, for such applications the disclosed systems and methods may provide a platform for stable and scalable analysis that can be incorporated in data streams from different sources.

Reference will now be made in detail to the disclosed embodiments, examples of which are illustrated in the accompanying drawings.

FIG. 1 is a block diagram of an exemplary system 100, consistent with disclosed embodiments. In system 100 a service provider (not pictured), such as a streaming service or an online retailer, may process data streams in real-time to, for example, identify anomalous activity or suspicious behavior and generate alerts. System 100 may include a service system 105, which may include a stream operator 110, a real-time state calculator 120, and a client request interface 130. System 100 may additionally include online resources 140, client devices 150, third party systems 160, client systems 190, and databases 180. In some embodiments, as shown in FIG. 1, components of system 100 may be connected to a network 170. However, in other embodiments components of system 100 may be connected directly with each other, without network 170. For example, databases 180 may be directly coupled to service system 105.

Online resources 140 may include one or more servers or storage services provided by an entity such as a provider of website hosting, networking, cloud, or backup services. In some embodiments, online resources 140 may be associated with hosting services or servers that store web pages for authentication services, Domain Name System (DNS), or landing pages. In other embodiments, online resources 140 may be associated with a cloud computing service. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as handling digital rights management.

Client devices 150 may include one or more computing devices configured to perform one or more operations consistent with disclosed embodiments. For example, client devices 150 may include a desktop computer, a laptop, a server, a mobile device (e.g., tablet, smart phone, etc.), a set-top box, a gaming device, a wearable computing device, or other type of computing device. Client devices 150 may include one or more processors configured to execute software instructions stored in memory, such as memory included in client devices 150, to perform operations to implement the functions described below. Client devices 150 may be configured for wired and/or wireless communications and may include software that when executed by a processor performs internet-related communication (e.g., TCP/IP) and content display processes. For instance, client devices 150 may execute browser software that generates and displays interfaces including content on a display device included in, or connected to, client devices 150. Client devices 150 may execute applications that allow client devices 150 to communicate with components over network 170, and generate and display content in interfaces via display devices included in client devices 150.

Figure 6:
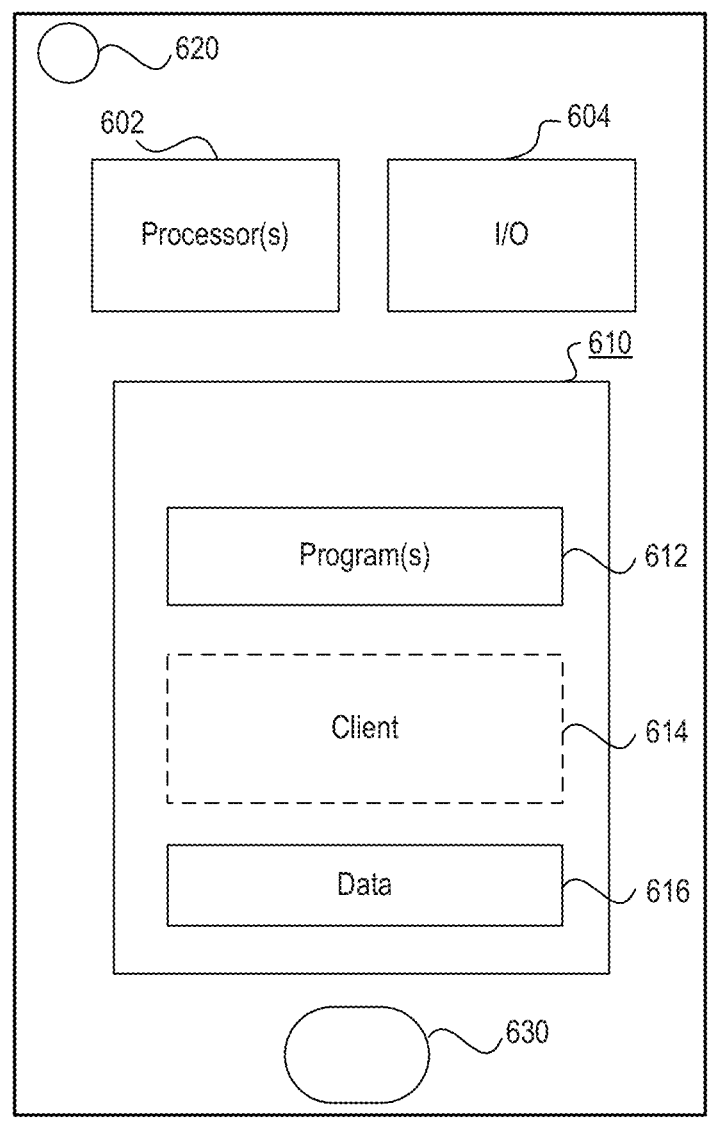
FIG. 6 is a block diagram of an exemplary client device, consistent with disclosed embodiments.

In some embodiments, as further disclosed in connection to FIG. 6, client devices 150 may run applications specifically configured to interact with service system 105. Moreover, client devices 150 may store one or more accounts. For example, client devices 150 may store information about a user account, including user identification, password, location, and electronic payment information.

The disclosed embodiments are not limited to any particular configuration of client devices 150. For instance, a client device 150 may be a mobile device that stores and executes mobile applications to perform operations that provide functions offered by service system 105 and/or online resources 140. In certain embodiments, client devices 150 may be configured to execute software instructions relating to location services, such as GPS locations. For example, client devices 150 may be configured to determine a geographic location and provide location data and time stamp data corresponding to the location data. Client devices 150 are further described in connection with FIG. 6.

Databases 180 may include one or more computing devices configured with appropriate software to perform operations consistent with providing service system 105, stream operator 110, real-time state calculator 120, and/or client request interface 130 data for performing transactions with client devices 150. Databases 180 may include, for example, Oracle™ databases, Sybase™ databases, or other relational databases or non-relational databases, such as Hadoop™ sequence files, HBase™, or Cassandra™. Databases 180 may include computing components (e.g., database management system, database server, etc.) configured to receive and process requests for data stored in memory devices of the database(s) and to provide data from the database(s).

While databases 180 are shown separately, in some embodiments databases 180 may be included in, or otherwise related to, one or more of service system 105, stream operator 110, real-time state calculator 120, client request interface 130, and online resources 140.

Databases 180 may be configured to collect and/or maintain the data associated with user accounts and user preferences. For example, databases 180 may store information about user profiles for users of service system 105. Databases 180 may collect the data from a variety of sources, including, for instance, online resources 140. Databases 180 are further described below in connection with FIG. 5.

Third party systems 160 may include one or more servers or storage services provided by an entity related to service system 105, such as a provider of services or a fulfillment center. Third party systems 160 may be connected to system 100 via network 170, but in other embodiments third party systems 160 may include direct connections with some elements of system 100. Further, third party systems 160 may be configured to provide and/or request information from service system 105, or other elements of system 100. In some embodiments, while third party systems 160 may also be coupled to network 170, they may not be clients of service system 105. Instead, third party systems 160 may include systems that include information of users or clients of service system 105. For example, third party systems 160 may include government servers with fraudulent activity records and/or records of fraudulent accounts, which may be used by service system 105 to make fraud determinations.

Client system 190 may include one or more servers or storage services in communication to service system 105 via network 170. Client systems 190 feed data streams to service system 105, which service system 105 may process in real-time using disclosed systems and methods. For example, client systems 190 may transmit data streams with events of credit card authorization requests and/or purchase orders. In such embodiments, the events transmitted from client systems 190 may include user information, location, transaction amount, IP address, and/or currency. Further, client systems 190 may operate Windows®, macOS®, or Linux® operating systems.

Client systems 190 may include a plurality of different systems using different communication protocols. For example, client system 190 may be in different geographic locations, use specific communication channels and/or ports, or communicate via different mediums. For example, some of the client systems 190 may use TCP while other client systems 190 may use UDP. Therefore, in some embodiments, service system 105 may include filters and normalizers to identify and outlier data and normalize it according to normalization rules. The normalization rules may include transforming all the time stamps from events into GMT or transforming all the amount information to U.S. dollars. Moreover, in some embodiments, client systems 190 may include aggregator website or a search engine, which may pull frequently information from service system 105. Alternatively, or additionally, client systems 190 may host e-commerce websites. In some embodiments, client systems 190 may provide services to client devices 150. In other embodiments, client systems 190 and client devices 150 may be operated by the same users and may be geographically co-located. In yet other embodiments, client systems 190 and client devices 150 may be independent from each other.

In one configuration, stream operator 110 may include one or more computing systems configured to perform operations consistent with processing data streams received from, for example, client systems 190. In some embodiments, stream operator 110 may receive purchase orders or authorization requests from client systems 190 and/or client devices 150. For example, client systems 190 may provide data streams with payment information for purchase transaction. Stream operator 110 may provide infrastructure and components to capture events in data streams, filtering, analyzing, and providing conclusions. In such embodiments, stream operator 110 may extract keys and values from data streams in real-time to verify/decline transactions. Further, stream operator 110 may resolve events in the data stream to associate them with user accounts and/or user preferences.

In some embodiments, stream operator 110 may generate data structures that can be used as inputs in predictive models to determine anomalies and/or detect fraud. For example, stream operator 110 may arrange data streams in bi-dimensional arrays or matrices of key and value pair that may be used to make determinations on anomalous or rare events in the data stream. In such embodiments, as further described below in connection with FIG. 8, stream operator 110 may extract keys and values from data streams and identify accounts associated with events based on event keys. Moreover, stream operator 110 may perform filtering or normalizing functions on information in the data stream to facilitate real-time data processing of events in the data stream. Stream operator 110 is further described in connection with FIG. 2.

Real-time state calculator 120 may include one or more computing systems configured to determine or generate state variables associated with events in data streams. As further described in connection with FIGS. 14A-14C, the state variables may be configured to be updated periodically or based on triggering events. In some embodiments, state variables generated by real-time state calculator 120 may be configured be accessible with operators having O(1) complexity. For example, state variables may be configured to be accessible with operators that run in constant time regardless of the input size, including, for example, arrays, with an operator to access an element, fixed-size stack, with operators for push and pop methods, and fixed-size queue, with operators for enqueue and dequeue methods.

In some embodiments, real-time calculator 120 may receive information from the stream operator and associate it with a state variable based on extracted keys or values in a data stream. For example, after stream operator 110 identifies an event is associated with a phone number, real-time calculator 120 may identify one or more state variables that are associated with the phone number to then process data and make conclusions.

Real-time state calculator 120 may be configured to perform accumulative and differential operations on state variables. Moreover, real-time state calculator 120 may be configured to generate rules for determination of historic trends in the variables. For example, real-time state calculator 120 may be configured to determine expiration rules for events that affect the state variables. In such embodiments, real-time state calculator 120 may determine that events older than 24 hours will no longer affect a state variable and the event influence may be eliminated after 24 hours. Further, real-time state calculator 120 may also identify rules for generating an alert. For example, real-time state calculator 120 may determine a threshold of number of transactions. If a number of transactions stored in a state variable exceed the threshold amount, then real-time state calculator 120 may generate an alert of anomaly or potentially fraudulent activity.

Real-time state calculator 120 may also include hardware and software to accumulate events in state variables. For example, real-time state calculator 120 may execute operations to modify state variables by adding a new event or removing an expired event. In some embodiments, modification of state variables is only triggered by an incoming event. That is, real-time state calculator 120 may be configured to only modify state variables when triggered by a relevant event to minimize computation costs and memory utilization.

Moreover, real-time state calculator 120 may be configured to generate and/or apply predictive models that determine fraudulent or irregular behavior in data streams. Real-time state calculator 120 may train artificially intelligence models such as convolutional neural networks (CNN) or random forest (RF) analysis to identify abnormal behavior in data streams. In some embodiments, real-time state calculator 120 may update status variables based on an event and use them as the input for a CNN or RF model that may return the probability of irregular behavior. In such embodiments, real-time state calculator 120 may generate an alert when the probability resulting from the model is above a threshold probability.

In some embodiments, real-time state calculator 120 may include hardware and software to handle memory operations during the operation of service system 105. For example, real-time state calculator 120 may include storage devices that store state variables with information about accounts. Further, real-time state calculator 120 may be configured to perform memory operations that minimize memory utilization. For example, real-time state calculator 120 may include storage devices configured to eliminate duplicated information or identify irrelevant records that can be discarded to open up space of additional information. Real-time state calculator 120 is further described in connection with FIG. 3.

Client request interface 130 may include one or more computing systems that perform operations to respond requests of other systems connected to network 170. For example, client request interface 130 may provide support for application programming interfaces (APIs) that client systems 190 may use to interact with service system 105. Client request interface 130 may be configured to prevent transactions when they are associated with a fraudulent or compromised account. Client request interface 130 may also include hardware or software to process client requests, which may include approval authorizations, inventory requests, and/or purchase orders.

In some embodiments, client request interface 130 may include processors that perform authentication functions of client devices 150 or client systems 190. For example, client request interface 130 may identify requests based on client IDs and/or a secure token that is then compared to alert notices that are generated by, for example, real-time state calculator 120. In some embodiments, client request interface 130 may include processors configured to encode content and packet content in different formats. In some embodiments, client request interface 130 may include multiple core processors to handle concurrently multiple operations and/or streams. For example, client request interface 130 may include parallel processing units to concurrently handle requests of multiple client devices 150.

In some embodiments, client request interface 130 may be configured to handle specific requests from other domains in system 100 in batches, not in real-time. For example, if client systems 190 request the status of an account, client request interface 130 may be configured to respond to query based on stored processing results. However, this response may not be processed in real-time but, instead, it may get processed when resources are available to review state variables and execute predictive models. Thus, client request interface 130 may include administration elements that can monitor the current capacity and bandwidth of other elements in service system 105 to respond to client requests. Alternatively, or additionally, client request interface 130 may include dedicated hardware to handle client requests. For example, client request interface 130 may include a Simple Risc Computer (SRC) architecture, or other reconfigurable computing system, specifically configured to handle pull client requests. Client request interface 130 is further described in connection with FIG. 4.

FIG. 1 shows stream operator 110, real-time state calculator 120, and client request interface 130 as different components of service system 105. However, one or more of stream operator 110, real-time state calculator 120, and client request interface 130 may be implemented in the same computing system. For example, all elements in service system 105 may be embodied in a single server having different virtualization modules. Alternatively, service system 105 may be embodied in a distributed computing framework with different modules to perform the roles of stream operator 110, real-time state calculator 120, and client request interface 130.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s). In yet other embodiments, network 170 may include multiple networks, organizing for example a network or networks.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Figure 2:
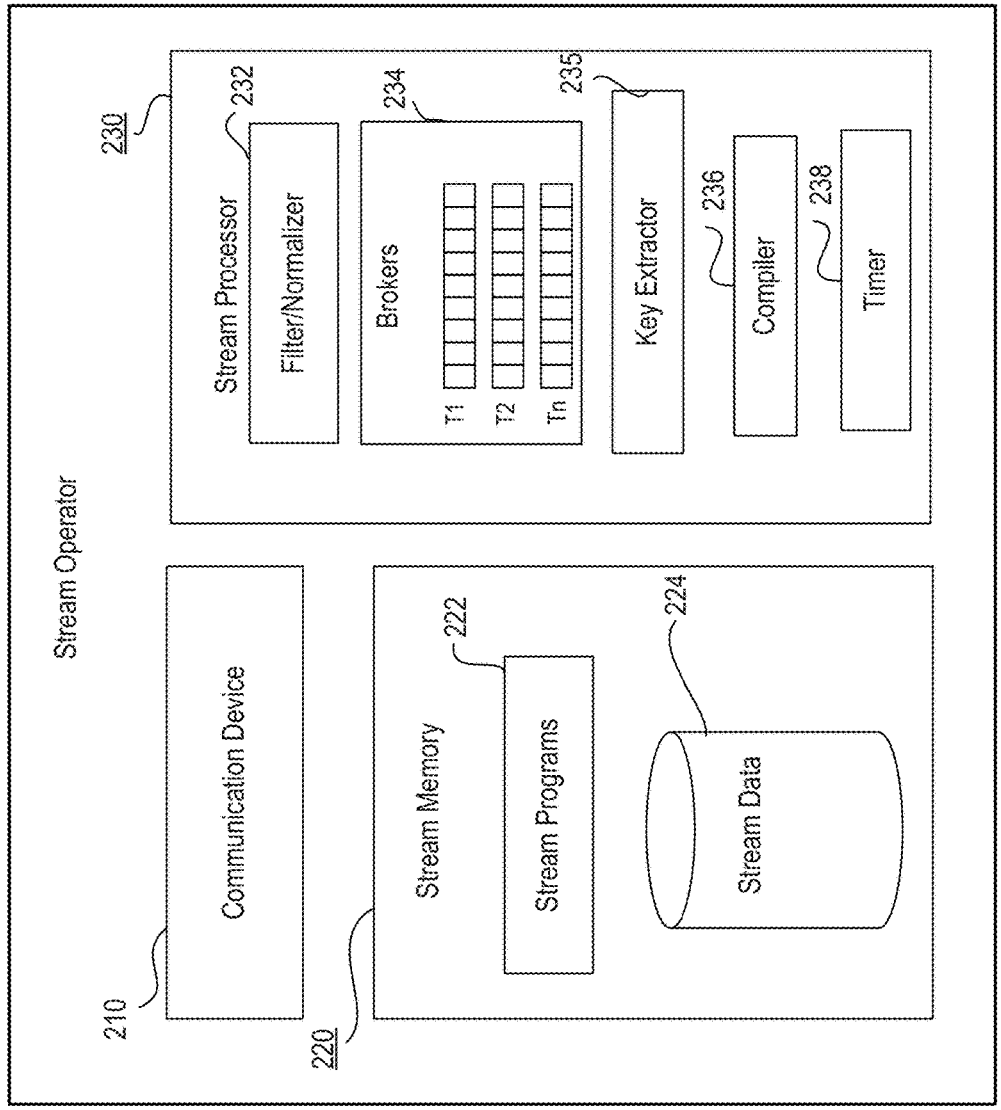
FIG. 2 is a block diagram of an exemplary stream operator, consistent with disclosed embodiments.

FIG. 2 shows a block diagram of an exemplary stream operator 110 (FIG. 1), consistent with disclosed embodiments. Stream operator 110 may include a communication device 210, a stream memory 220, and one or more stream processors 230. Stream memory 220 may include stream programs 222 and stream data 224. Stream processors 230 may include a filter/normalizer 232, brokers 234, compiler 236, and a timer 238.

In some embodiments, stream operator 110 may take the form of a server, a general purpose computer, a mainframe computer, or any combination of these components. In other embodiments, stream operator 110 may be a virtual machine. Other implementations consistent with disclosed embodiments are possible as well.

Communication device 210 may be configured to communicate with one or more databases, such as databases 180 described above, and other elements of system 100 either directly or via network 170. In particular, communication device 210 may be configured to receive data streams from client systems 190 and client devices 150. Further communication device 210 may be configured to receive user account information from databases 180 to determine corresponding state variables when sending information to real-time state calculator 120. In addition, communication device 210 may be configured to communicate with other components as well, including, for example, real-time state calculator 120 and client devices 150. For example, via communication device 210, stream operator 110 may transmit keys and values of events in a data stream to real-time state calculator 120. Then, based on the received keys and events, service system 105 may update accumulation state variables to identify abnormal behavior.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Stream memory 220 may include one or more storage devices configured to store instructions used by stream processors 230 to process data streams in real time. For example, stream memory 220 may store software instructions, such as stream programs 222, that may perform operations when executed by stream processors 230. The disclosed embodiments are not limited to separate programs or computers configured to perform dedicated tasks. For example, stream memory 220 may include a single stream program 222 that performs the functions of stream operator 110, or stream programs 222 may include multiple programs. Stream memory 220 may also store stream data 224 that is used to store extracted keys and values from processed streams and/or previously extracted information for analyzing historic trends. For example, stream data 224 may include copies of previously extracted account information.

In certain embodiments, stream memory 220 may store sets of instructions for carrying out processes to extract information from data streams, perform user authentication tasks, and/or interact with databases 180 to determine the status of user accounts. In certain embodiments, stream memory 220 may store sets of instructions for requesting additional information from client systems 190. Other instructions are possible as well. In general, instructions may be executed by stream processors 230 to perform processes consistent with disclosed embodiments.

In some embodiments, stream processors 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, stream processors 230 may be a plurality of devices coupled and configured to perform functions consistent with the disclosure. For example, stream processors 230 may include a plurality of co-processors, each configured to run specific stream operator 110 operations such as floating point arithmetic, graphics, signal processing, string processing, cryptography or I/O interfacing.

In some embodiments, stream processors 230 may execute software to perform functions associated with each component described in stream processor 230. In other embodiments, each component of stream processors 230 may be an independent device. In such embodiments, each component may be a hardware device configured to specifically process data or perform operations of processing data streams. For example, a filter/normalizer 232 in stream processor 230 may be a field-programmable gate array (FPGA), a compiler 236 may be a central processing unit (CPU). Other hardware combinations are also possible. In yet other embodiments, combinations of hardware and software may be used to implement stream processors 230.

Filter/normalizer 232 may process data streams to eliminate events that are not relevant for service system 105. Further, filter/normalizer 232 may prepare events in data streams for further processing by stream operator 110. For example, filter/normalizer 232 may eliminate events in data streams when they are unrelated with a timed operation. In such embodiments, filter/normalizer 232 may eliminate events related to change of passwords, or username requests, but keep other events such as purchase request or transaction authorization requests. Further, filter/normalizer 232 may be configured to tailor service system 105 to specific applications. For instance, a user configuring service system 105 to detect fraud in electronic transactions, may setup filter/normalizer 232 to eliminate any event that is unrelated to electronic transactions. Applying such filters in boundaries between different domains may improve computer operation by minimizing required processing of irrelevant events. In such embodiments, filter/normalizer 232 may include parsers and symbol identifiers, such as filtering out any event without a number or currency identification. Alternatively, or additionally, filter/normalizer 232 may also include filter based on header information of events in the data stream. For example, filter/normalizer 232 may filter out events that come from IP addresses not associated with merchants associated with service system 105.

In some embodiments, filter/normalizer 232 may be implemented with real-time application-controlled TCP/IP tracers. In such embodiments, filter/normalizer 232 may provide real-time TCP/IP stack data to network management applications to setup filters that capture header or payload characteristic signals. Filter/Normalizer 232 may concurrently apply multiple filters to data streams opening multiple trace instances and setting unique filters for each trace instance to obtain the desired data. In such embodiments, filter/normalizer 232 may be set for data trace type events or packet trace. With both configurations, filter/normalizer 232 may provide real-time TCP/IP network monitoring based on the global settings for the TCP/IP stack. Also, filter/normalizer 232 may store and notify other elements of service system 105 of lost or discarded data.

Filter/normalizer 232 may also modify incoming events to standardize formats or data arrangement to facilitate downstream processing. For example, filter/normalizer 232 may curate events in data streams so brokers 234 can quickly recognize keys and values after filter/normalizer 232 normalizes them. In such embodiments, filter/normalizer 232 may take raw data, processes it, and outputs the data in a format more conducive to analysis. Thus, filter/normalizer 232 may serve a number of purposes including data enrichment, filtering, and aggregation. In some embodiments, filter/normalizer 232 may be implemented using Apache Spark™ for filtering or transformation. However, other distributed, memory-optimized systems may also be applicable to filter/normalizer 232.

Filter/normalizer 232 may modify specific categories of events to facilitate later processing. For example, filter/normalizer 232 may normalize the time stamp associated with each event to simplify time difference calculation and have other elements in service system 105 operate with a single clock. Further, to facilitate aggregation tasks by real-time state calculator 120, filter/normalizer 232 may standardize currencies, identification information (e.g., converting usernames and emails to ClientID), formats of data (e.g., converting .doc files to .txt). These preparatory tasks may improve the performance of the computer when processing real time information.

In some embodiments, filter/normalizer 232 may be configured with one or more operators that transform an input stream into an output stream. Operators in filter/normalizer 232 may process each event in data streams to modify at least one aspect and then submitting the event only if it meets the operator requirement. For example, every event in a data stream may be configured to contain information like account number, transaction date, transaction time, and transaction price. In such embodiments the event can be represented by the following 4-variable "Transaction Record" type:

Transaction Record=
rstring account,
rstring date,
rstring time,
decimal64 price;

where rstring is a sequence of raw bytes that supports string processing when the character encoding is known, and decimal64 is the IEEE 754 decimal 64-bit floating point number.

Filter/normalizer 232 may read each one of the data filed in the event and compare them with an operator to then generate an output stream produced by operating on the input stream with the operator. In general, filter/normalizer 232 operators may receive events from an input stream and submits an event (which may also be known as a "tuple") to the output stream only if the tuple satisfies the criteria that are specified by the filter parameter.

In some embodiments, operators in filter/normalizer 232 may perform the following steps: (1) Receive events from an input data stream; (2) If the value of the account attribute is an existing customer, submit the event to the output stream; (3) Repeat Steps 1 to 2 until all the events from the input stream are processed. Filter/normalizer 232 operators may perform operations in different types of data streams and convert formats as required. For example, in some embodiments the type of the output stream is specified by the input stream in a declaration "stream<Type> OutputStream=Filter (InputStream)." The format conversions may include data coding conversion, such as converting a text file from one character encoding system to another; or file conversion, such as the conversion of office file formats, or the conversion of image formats and audio file formats. Further format conversions may include currency, time zone, and/or client identification conversions. In other embodiments, however, there may not be any declaration and the type of stream may be modified by filter/normalizer 232 based on requirements of brokers 234 or other elements of service system 105.

Brokers 234 may include stream-processing software. For example, in some embodiments, stream operator 110 may implement a processing platform such as Apache Kafka®. In such embodiments, brokers 234 may include one or more servers running on the processing platform. Brokers 234 may process data streams, before or after filter/normalizer 232, and publish data into topics within brokers 234.

In such embodiments, brokers 234 may be configurable to extract and store key-value messages that come events in data streams from client systems 190. Brokers 234 may divide data into different "partitions" within different "topics". Within a partition, brokers 234 may order key-value messages by their offsets (the position of a message within a partition), and indexed and stored together with a timestamp, which may be determined by a timer 238.

Brokers 234 may be operated with stream APIs that allow writing Java applications that consume data from streams. In some embodiments, the stream API may be provided by stream processor 230 and receive instructions from other elements of service system 105 and/or other elements of system 100, such as client devices 150. In such embodiments, the stream API may enable transforming streams of data from input topics to output topics using brokers 234. Further brokers 234 may be configurable to work with external stream processing systems such as Apache Apex, Apache Flink, Apache Spark, and Apache Storm. For example, brokers 234 may be configurable to import/export data from/to other systems using a connect API that executes connectors that implement the actual logic to read/write data from other systems. A connect API may be provided by stream processor 230 and may define the programming interface that must be implemented to build a custom connector. For example, the connect API may allow implementing connectors that continually pull from some source system or application into processor 230 running Kafka or push from Kafka into some sink system or application, such as client systems 190. Alternatively, or additionally, brokers 234 may operate with a stream-processing library. The library may allow for the development of stateful stream-processing applications that are scalable, elastic, and fully fault-tolerant. For example, brokers 234 may also include high-level operators like filter, map, grouping, windowing, aggregation, joins, and the notion of tables to organize and process events in data streams received from client systems 190, or other elements of system 100. Additionally, or alternatively, brokers 234 may implement custom operators for a more low-level development approach and provide fault-tolerance operations.

In some embodiments, brokers 234 may be configured to be redundant to minimize fault risks. For example, partitions of all topics may be distributed across the clusters of brokers 234. Additionally, partitions of events may be replicated to multiple brokers 234. This architecture allows the delivery of data streams in a fault-tolerant fashion.

Brokers 234 may support both regular and compacted topics for processing event. Regular topics can be configured with a retention time or a space bound. If there are records that are older than the specified retention time or if the space bound is exceeded for a partition, brokers 234 may be allowed to delete old data to free storage space. For example, brokers 234 may be coupled with stream memory 220 and provide instructions to delete events that have expired. In such embodiments, topics developed by brokers 234 may be configured with a retention time of 7 days. However, other time windows can be possible. For instance, a time window of 24 hours could be configured for certain data streams or specific variables in the stream. Additionally, or alternatively, time windows may be dynamic and may be programmed based on historic trends. For example, if stream operator 110 notices an influx of transactions from a specific location, stream operator 110 may modify the time window to decrease it and prevent potential concurrent attacks. In other embodiments, having compacted topics some records may not expire. Instead, brokers 234 may treat later messages as updates to older message with the same key and guarantees keeping the latest message per key. This accumulation in variables may be beneficial when performing differential operations to reduce computer utilization.

Moreover, different elements of system 100 may interact with brokers 234 using API's supported by stream operator 110. For example, client devices 150, client systems 190, and/or online resources 140 may interact with brokers 234 with (1) a producer API, which allows publishing streams of records; (2) a consumer API, which allows to subscribe to topics and processes streams of records; (3) a connector API, executing the reusable producer and consumer APIs that can link the topics to the existing applications, and/or (4) stream API, which converts the input streams to output and produces the result. In some embodiments, the consumer and producer APIs may build on other stream processing elements, such as filter/normalizer 232, and my offer a reference implementation for consumers and producers clients in Java. In such embodiments, the underlying messaging protocol may be a binary protocol that developers can use to write their own consumer or producer clients in any programming language. Further, in such embodiments the API's may be executed and/or supported by stream processor 230. However, these API's may be hosted by other elements of service system 105 or may be hosted remotely, for example by online resources 140.

In some embodiments, brokers 234 may work in conjunction with key extractor 235, which may include software and/or hardware configured to extract keys in events coming from data streams. For example, brokers 234 may classify and process events in different topic based on keys extracted by key extractor 235. Alternatively, key extractor 235 may operate without brokers 234 as an independent element.

Stream operator 110 may process events in data streams by generating messages of key/value pairs. Keys may be used for partitioning and modeling tables and topics (e.g., KSQL or Ktable) for query or join purposes. The keys may include characteristics of the events. For example, keys may include IP address, Client ID, account number, geographical location, or other identifying information of the event. The values, may qualify the key to determine a partition. Key extractor 235 may be configurable to extract keys from events in data streams. For example, key extractor 235 may obtain keys to determine a partition within a record to which an event is associated with (e.g., type of transaction). In contrast, the value associated with a key may be the actual payload of the event (e.g., value of the transaction). As further described in connection with FIG. 8, keys extracted from events in data streams may be associated to identify accounts or users related to the event.

Key extractor 235 may be configured to perform a series of get operations from the events while associating time stamps with the extracted keys. Get operations include operations to retrieve object information and may include constructors such as "Get(byte[ ] row)" or "Get(int rowOffset, int rowLength)." The get operations may also specify variable types to be extracted from events. For example, after filter/normalizer 232 process an input stream and generates an output stream with only the desired values, key extractor 235 may obtain, or get, keys from events by matching target key words with information in the event. For example, key extractor 235 may execute the following operations:

```
// Get data stream store named "datastream"
    ReadOnlyDatastream<String, Long> =
        streams ("datastream", QueryableTypes.datastream( ));
// Fetch values for a key (e.g., "amount") for all of the events available
long timeFrom = 0; // beginning of time = oldest available
long timeTo = System.currentTimeMillis( ); // now (in processing-time)
StreamIterator<Long> iterator =
        stream.fetch("amount", timeFrom, timeTo);
while (iterator.hasNext( )) {
        KeyValue<Long, Long> next = iterator.next( );
            long Timestamp = next.key;
            System.out.println("Count 'amount' @ time " + Timestamp + " is "
        + next.value).
```

Key extractor 235 may facilitate ordering events for predictive model analysis or to develop a state machine. For example, keys extracted by key extractor 235 may be used to put events in an order to setup event partitions and associate events with state variables, even if they are coming from multiple locations. In such embodiments, key extractor 235 may order events within a partition, but not across partitions in a topic. Moreover, key extractor 235 may implement topic-level configurations for brokers 234 and specify Java parameters such as "log.cleaner.enable" to deduplicate entries with the same key. In such embodiments, key extractor 235 may be coupled to stream memory 220 and key extractor 235 may assume only the most recent instance of a given key is relevant and delete older duplicates of a given key only if the key is not null. For example, because state variables may be updated by real-time state calculator 120, older events with repeated keys do not need to be retained and may be deleted to save space. In some embodiments, form of log compaction may be controlled by Java parameters such as "log.cleaner.delete.retention" property.

Key extractor 235 may provide components to identify in real-time specific information in data streams to be able to categorize events and facilitate their analysis.

Compiler 236 may include software or hardware to compile programming languages to execute stream programs 222 with stream processor 230. Compiler 236 may output class files containing platform-neutral bytecode. Alternatively, or additionally, compiler 236 may provide optimized native machine code for a particular hardware/operating system combination. Compiler 236 may include Java-to-bytecode compilers, which may perform virtually no optimization to improve running time. In some embodiments, compiler 236 may include a virtual machine that loads class files and either interprets the bytecode or just-in-time compiles it to machine code and then possibly optimizes it using dynamic compilation. Furthermore, compiler 236 may perform interpreting operations to setup and configure brokers 234 operations. For example, compiler 236 may perform preprocessing, lexical analysis, parsing, semantic analysis (syntax-directed translation), conversion of input programs to an intermediate representation, code optimization and code generation. Compiler 236 may implement these operations in phases that promote efficient design and correct transformations of source input to target output.

Timer 238 may include hardware and/or software to process data streams. For example, timer 238 may include an API method to receive timing information to establish timestamps of events. Timer 238 may determine different time types for scheduling including either stream-time or wall-clock-time. In some embodiments, a stream-time is configured to represent event-time via a TimestampExtractor. Alternatively, timer 238 may implement a wall-clock-time that is triggered by an absolute time.

In some embodiments, timer 238 may implement operations to have a periodic stamping of events. for example:

```
schedule(1000, PunctuationType.STREAM_TIME, (timestamp) -> {
    KeyValueIterator<String, Long> iter = this.kvStream( );
    while (iter.hasNext( )) {
        KeyValue<String, Long> entry = iter.next( );
        context.forward(entry.key, entry.value.toString( ));
}
iter.close( );
```

The components of stream operator 110 may be implemented in hardware, software, or a combination of both. For example, although one or more components of stream operator 110 may be implemented as computer processing instructions embodied in computer software, all or a portion of the functionality of stream operator 110 may be implemented in dedicated hardware. For instance, groups of GPUs and/or FPGAs maybe used to quickly process multimedia content in stream processors 230.

Figure 3:
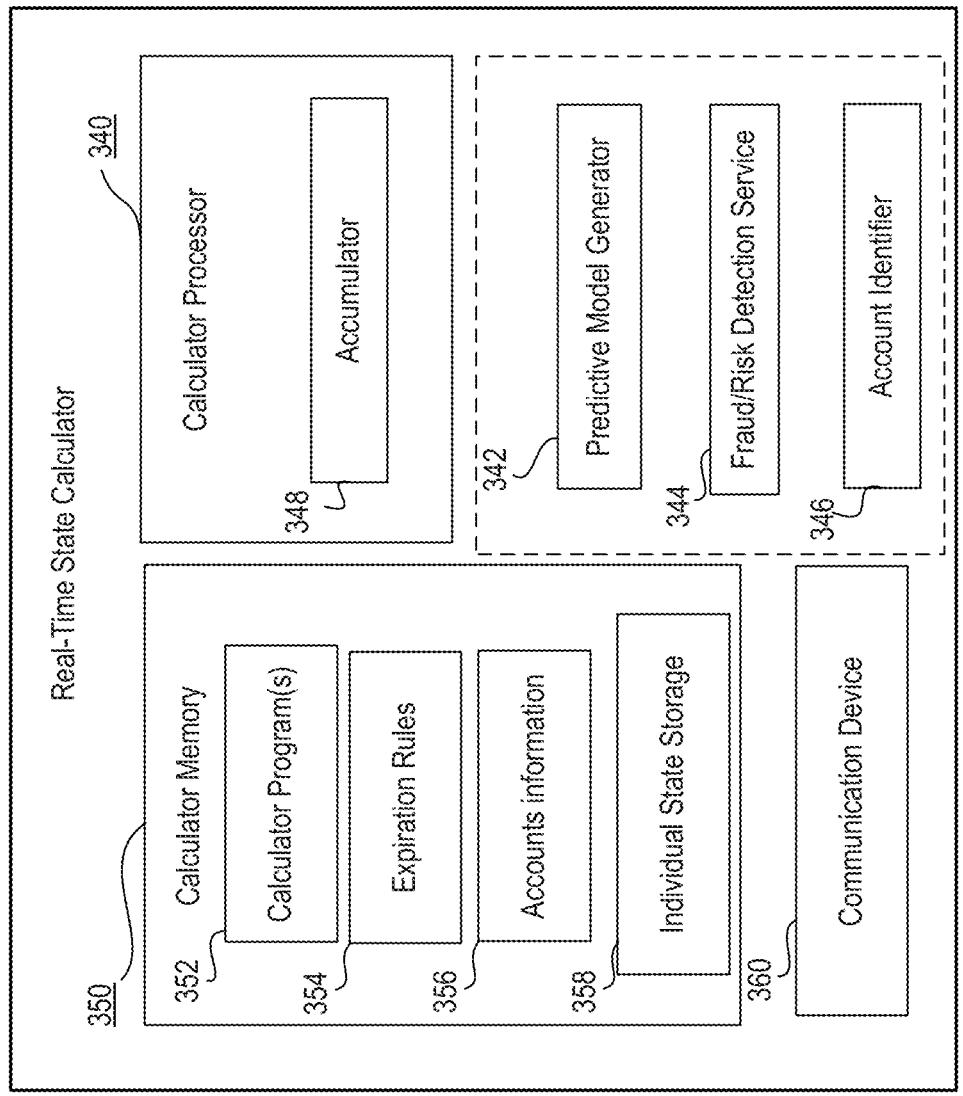
FIG. 3 is a block diagram of an exemplary real-time state calculator, consistent with disclosed embodiments.

Referring now to FIG. 3, there is shown a block diagram of an exemplary real-time state calculator 120 (FIG. 1), consistent with disclosed embodiments. Real-time state calculator 120 may include an calculator processor 340, a calculator memory 350, and a communication device 360. In some embodiments, real-time state calculator 120 may generate, monitor, and update state variables that based on events captured from data streams. Moreover, real-time state calculator 120 may generate alerts for accounts when corresponding state variables overcome a specified threshold. Real-time state calculator 120 may communicate the alerts to other elements of system 100. For example, real-time state calculator 120 may provide alert notifications to stream operator 110 or to client request interface 130.

Calculator processors 340 may be embodied as a processor similar to stream processors 230. Calculator processor 340 may include a state variable accumulator 348. As shown in FIG. 3, in some embodiments, real-time state calculator may also include a predictive model generator 342, an fraud/risk detection service 344, and an account identifier 346, which may be different modules from calculator processors 340. However, in other embodiments predictive model generator 342, fraud/risk detection service 344, and account identifier 346, may be included or be implemented by calculator processors 340.

Predictive model generator 342 may receive event information to generate or train predictive models based on state variables. For example, predictive model generator 342 may receive processed data from previous data streams that resulted in fraud or abnormal behavior. With this information, predictive model generator 342 may resolve models that use multiple state variables to determine the likelihood of a group of events in data streams resulting in abnormal or fraudulent activity.

In some embodiments, predictive model generator 342 may include machine-learning models that get updated as new event information is being received from multiple data streams. For example, as further discussed in connection with FIGS. 12 and 13, predictive model generator 342 may train random forest or convolutional neural network models that use event information to determine when state variables are correlated with a probability of irregular behavior and/or fraudulent activity.

In addition to training models, predictive model generator 342 may also perform validation tasks. Predictive model generator 342 may hold out a percentage of training data (e.g., events in a previous data stream) for validation purposes. If a validation holdout is specified, a separate process runs to validate the model against the validation set. Thus, predictive model generator 342 may perform both the initial generation and parameter adjustments.

Further, predictive model generator 342 may establish accessing methods to the models using, for example, a modeling API for a Training microservice. The microservice may be used to submit training requests, retrieve model results, and/or list jobs. Predictive model generator 342 may also provide user interfaces for interacting with data.

Fraud/risk detection service 344 may include software and/or hardware to transmit alerts about potential irregularities based on events in data streams. In some embodiments, fraud/risk detection service 344 may not actively generate and send an alert. Instead, fraud/risk detection service 344 may accept requests to detect if there is any risks via an HTTP REST API. In such embodiments, as further described in connection to FIG. 15, fraud/risk detection service 344 may be passive and asynchronized with accumulator 348. Such configuration provides certain technical advantages that facilitate detection of anomalies and triggering alerts in system 100. For example, with the HTTP REST API configuration, fraud/risk detection service 344 may review variables of different events and from different domains. Thus, to detect a fraud of payment transaction, fraud/risk detection service 344 may look at variables associated with registration, login, return, orders, credit card updates, credit card authentication, among others. Moreover, with the described configuration, fraud/risk detection service 344 may have faster response. Because fraud/risk detection service 344 can operate on isolated variables, fraud/risk detection service 344 can still retrieve existing variables from databases when there is a delay or jam in variable calculation/updates. This ability to overcome network congestion may be beneficial in detection of payment transaction in which fraud/not fraud decisions should happen in less than 100 ms. Moreover, by isolating fraud/risk detection service 344 and accumulator 348 system 100 may be more robust. In such embodiments, fraud/risk detection service 344 may include models and rules for identification of fraudulent activity and transmitting requests.

In other embodiments, fraud/risk detection service 344 may monitor the value of state variables and generate an alert when the value exceeds a threshold. For example, when monitoring a state variable accumulating amount of transactions associated with an account, fraud/risk detection service 344 may trigger an alert when the value associated with the amount key exceeds $10,000. Then, if a state variable exceeds the threshold it may mean that the account associated with that state variable has been compromised and generate an alert. Alternatively, or additionally, fraud/risk detection service 344 may monitor the result of predictive models. Whenever a predictive model results in a high probability of abnormality or fraud, defined above a threshold (e.g., above 80% probability), alert generator may transmit alerts associated with the account.

In some embodiments, fraud/risk detection service 344 may generate alerts based only on state variables as calculated by calculator processor 340. However, in other embodiments, fraud/risk detection service 344 may tap directly into the stream of transactions coming from client systems 190. Then, for every key, fraud/risk detection service 344 may execute the steps of looking up if the value associated with the key is above a specified threshold. Additionally, or alternatively, fraud/risk detection service 344 may update records for future interactions with the associated account. For example, fraud/risk detection service 344 may interact with client request interface 130 to update client registrations and prevent future interactions with a compromised account.

Account identifier 346 may perform operations to associate keys extracted from events in data streams with accounts and corresponding state variables. Account identifier 346 may derive an associated account based on one or more of extracted keys from events. Further, in some embodiments, even when unique information is not extracted as keys, account identifier 346 may determine whether an address of the event or an associated location determines a correlation between accounts and events. Account identifier 346 may establish relationship between event keys and accounts by querying databases. In some embodiments, that require fast response times during the real-time processing, account identifier 346 may query non-relational databases (such as NOSQL) to correlate keys with an account. Additionally, or alternatively, account identifier 346 may use multiple keys in an event to identify an account associated with the event. For example, account identifier 346 may consider the location, amount, and merchant type of a transaction to associate it with an account, even when keys are insufficient to identify the account.

Accumulator 348 may be configured to update state variables based on events in data streams. In addition, accumulator 348 may remove the influence from certain events in state variables when they expire. Further, accumulator 348 may associate a timer or callback when updating state variables based on new events. For example, when an event is received and stream operator 110 (FIG. 2) identifies it as a triggering event, keys are extracted by key extractor 235, and an account is identified, accumulator 348 may modify state variables associated with the account based on the event. For example, as further described in connection with FIGS. 14A-14C, accumulator 348 may accumulate transaction amounts in a variable that is monitoring purchase amounts. In some embodiments, accumulator 348 may store the accumulated variables and transmit them to fraud/risk detection service 344.

Accumulator 348 may be configured to quickly update variables and keep their complexity low to facilitate rapid access and rapid conclusions. In some embodiments, accumulator 348 may use O(1) functions, in which the execution time of the algorithm does not depend on the size of the input, to update state variables. In such embodiments, having uniform execution times for updating variables may improve the operation of the system by minimizing latency.

While FIG. 3 shows accumulator 348, fraud/risk detection service 344, and predictive model generator 342 related to calculator processor 340, in some embodiments each one of these elements may be separated components and have specific hardware, tailored for the target application. For example, predictive model generator 342 may be an FPGA while accumulator 348 may be a CPU.

Calculator memory 350 may include one or more storage devices configured to store instructions used by calculator processor 340 to perform operations related to disclosed embodiments. For example, calculator memory 350 may store software instructions that may perform operations when executed by calculator processor 340. In addition, calculator memory 350 may include calculator program(s) 352 (which may specify functions and key extraction methods), expiration rules 354 (determining when an event should no longer influence a state variable), and accounts information 356 (including correlations between keys extracted from events, accounts, and corresponding state variables).

Calculator memory 350 may also include rapid access individual state storage 358. To minimize latency during real-time calculations and allow reaching conclusions quickly, individual state storage 358 may be implemented with SRAM. Alternatively, or additionally, individual state storage 358 may use other fast access memories. For example, individual state storage 358 may include cache memories in hybrid transactional and analytical processing arrangements to facilitate communication between processing and memory units. In such embodiments, individual state storage 358 may be implemented having a single database backend to support both transactional and analytical workloads.

Individual state storage 358 may store the state variables that are generated and updated based on events in data streams. In such embodiments, individual state storage 358 may include a native function to eliminate duplicates or only allow access to the state variable when there is a triggering event. Such configurations may improve the functioning of the computer by relaxing hardware requirement and maintaining only one copy of data. Thus, individual storage 358 may facilitate high performance for both short and long term state variables because it keeps the complexity of functions uniform. Also, the calculated data points may be stored in the individual state storage 358, reducing memory utilization and improving hardware usage rates.

In some embodiments, individual state storage 358 may be configurable to be operated and used by accumulator 348. In such embodiments, individual state storage 358 may be a high performance embedded database for key-value data, such as RocksDB. Then, every accumulator instance may have its own state store in the RocksDB database, which may located within a same server. Individual state storage 358 and accumulator 348 may communicate with each other via local access and doesn't require network access. The communication in this way may be faster than remote via network and it's sufficient for an accumulator to talk with its embedded database. In some embodiments, key extractor 235 may be configured to send events with same key to a specific instance of accumulator 348. Thus, individual state storage 358 may store events for a particular key.

In certain embodiments, calculator memory 350 may store sets of instructions for carrying out processes to update state variables and enforce a O(1) complexity. For example, service system 105 may receive data streams from client systems 190. Based on this information, real-time state calculator 120 may determine the state of a variable. Calculator memory 350 may verify the processed state variables do not increase time complexity and can be used in algorithms that execute in the same time. For example, if calculator processor 340 outputs a variable with multiple dimensions that would cause delays when running a query operation, or the predictive model, calculator memory 350 may reduce the complexity of the variable by truncating or making operations, such as averages or modes, to enforce O(1) complexity in the overall algorithms.

Figure 4:
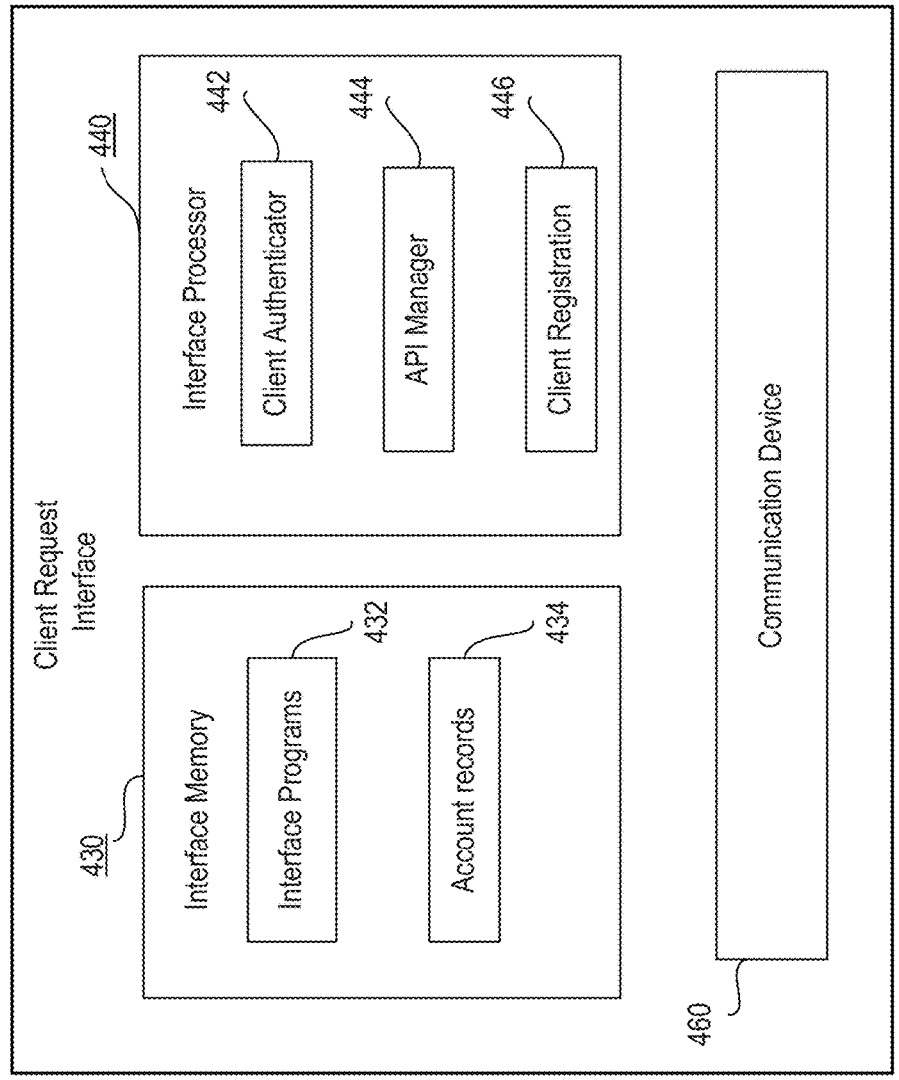
FIG. 4 is a block diagram of an exemplary client request interface, consistent with disclosed embodiments.

Referring now to FIG. 4, there is shown a block diagram of an exemplary client request interface 130 (FIG. 1), consistent with disclosed embodiments. Client request interface 130 may include an interface memory 430, an interface processor 440, and a communication device 460. In some embodiments, client request interface 130 may be configured receive requests to process transactions from client systems 190 and modify user account records based on approved transactions.

Interface memory 430 may include one or more storage devices configured to store instructions for handling transaction authorization requests from client systems 190 and/or client devices 150. Interface memory 430 may include interface programs 432, which may include API management instructions to support client systems 190 and interactions between, for example, client devices 150 and service system 105.

Interface memory 430 may also include account records 434, storing information about accounts that may be relevant to accept or decline transactions. For example, account records 434 may include files and databases of users of service system 105, including, among other things, alert notifications, available funds, and account preferences. Interface memory 430 may further include storage devices storing instructions used by interface processor 440 to perform functions related to disclosed embodiments. For example, interface memory 430 may store software instructions that may perform one or more operations when executed by interface processor 440.

Interface processor 440 may be embodied as a processor similar to stream processors 230. Interface processor 440 processor may include client authenticator 442, an API manager 444, and a client registration 446.

Client authenticator 442 may be implemented with hardware or software configured to compare credentials received from client devices 150 or client systems 190, such as passwords or biometric data received from the client devices 150, with information associated with the particular user account. Alternatively, or additionally, client authenticator 442 may resolve a client ID key in an event to identify a user account. For example, client authenticator 442 may be configured to identify keys with email addresses or phone numbers, and identify the requesting user account. In such embodiments, client authenticator 442 may perform encryption and decryption processes to provide and verify the identification tool.

API manager 444 may be implemented with hardware or software configured to perform operations to provide an API for other elements of system 100 for access to service system 105. API manager 444 may create and publish web APIs, enforcing their usage policies, controlling access, collecting and analyzing usage statistics, and reporting on performance. API Manager 444 may also provide mechanisms and tools to support developers of applications for service system 105. API manager 444 may perform operations of gateway, receiving API requests and enforcing security policies and passing requests to back-end components of service system 105. Additionally, or alternatively, API manager 444 may include publishing tools, a developer portal/API, reporting and analytics functionality, and monetization functionality.

Client registration 446 may be implemented with hardware or software configured to process new clients and determine, based on their registration information, if they are associated with existing accounts. To prevent potential fraud from new accounts that are not associated with any state variable or historic trends, client registration 446 may perform an analysis of new accounts to determine, based on extracted keys whether the new account should be accepted in service system 105.

Communication device 460 may be embodied as one or more digital and/or analog devices to enable communication between client request interface 130 and other elements of service system 105, and between client request interface 130 and other elements of system 100, such as client devices 150.

Figure 5:
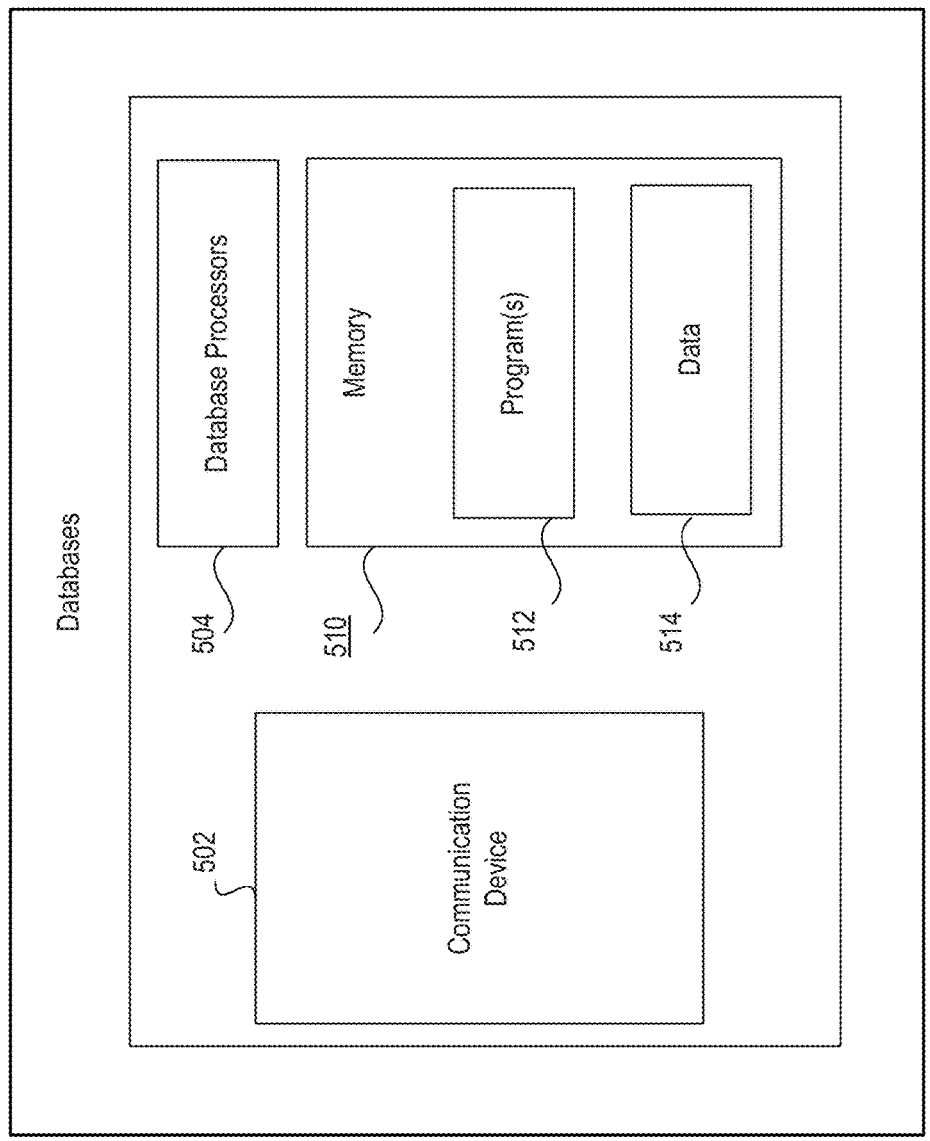
FIG. 5 is a block diagram of an exemplary database, consistent with disclosed embodiments.

Referring now to FIG. 5, there is shown a block diagram of an exemplary databases 180 (FIG. 1), consistent with disclosed embodiments. Databases 180 may include a communication device 502, one or more database processors 504, and database memory 510 including one or more database programs 512 and data 514. Databases 180 may include NoSQL databases such as HBase, MongoDB™ or Cassandra™. Alternatively, databases 180 may include relational databases such as Oracle, MySQL and Microsoft SQL Server.

In some embodiments, databases 180 may take the form of servers, general purpose computers, mainframe computers, or any combination of these components. In some embodiments, databases 180 are included within other elements of system 100, such as service system 105. Other implementations consistent with disclosed embodiments are possible as well.

In some embodiments, databases 180 may include both non-relational and embedded databases. For example, databases 180 may include a non-relational database, such as an Hbase, and an embedded database, such as a RocksDB (e.g., a key-value store database). The non-relational database may store variable values at different periods of time while the embedded database may store state variables—like the ones generated by accumulator 348—and events that affect state variables, like the expiring events, non-expiring events (including new events). In such embodiments, records in embedded may be local to the operators, having a data locality of 100% to facilitate key extraction and event dispatching with minimum latency.

Communication device 502 may be configured to communicate with one or more components of system 100, such as online resources 140, service system 105, real-time state calculator 120, client request interface 130, and/or client devices 150. In particular, communication device 502 may be configured to provide to real-time state calculator 120, stream operator 110, and client request interface 130 user account information, user preferences and privileges, and/or historic trends.

Communication device 502 may be configured to communicate with other components as well, including, for example, calculator memory 350 (FIG. 3), interface memory 430 (FIG. 4), and stream memory 220 (FIG. 2). Communication device 502 may take any of the forms described above for communication device 210 (FIG. 2).

Database processors 504, database memory 510, database programs 512, and data 514 may take any of the forms described above for stream processors 230, stream memory 220, stream programs 222, and stream data 224, respectively, in connection with FIG. 2. The components of databases 180 may be implemented in hardware, software, or a combination of both hardware and software. For example, although one or more components of databases 180 may be implemented as computer processing instruction modules, all or a portion of the functionality of databases 180 may be implemented instead in dedicated electronics hardware.

Database memory 510 may include programs 512, which may include instructions to support queries form client systems 190 and interactions between, for example, client devices 150 and service system 105. Further programs 512 may include instructions to store information in real-time as it is processed by service system 105.

Data 514 may be data associated with websites, such as online resources 140, or user accounts from client devices 150. Data 514 may include, for example, information relating to users and their credentials to obtain content. Data 514 may also include content files, similar to account records 434 (FIG. 4), including information to correlate keys extracted from events in data streams with user accounts.

Referring now to FIG. 6, there is shown a block diagram of an exemplary client device 150 (FIG. 1), consistent with disclosed embodiments. In one embodiment, client devices 150 may include one or more processors 602, one or more input/output (I/O) devices 604, and one or more memories 610. In some embodiments, client devices 150 may take the form of mobile computing devices such as smartphones or tablets, general purpose computers, or any combination of these components. Alternatively, client devices 150 (or systems including client devices 150) may be configured as a particular apparatus, embedded system, dedicated circuit, and the like based on the storage, execution, and/or implementation of the software instructions that perform one or more operations consistent with the disclosed embodiments. According to some embodiments, client devices 150 may include web browsers or similar computing devices that access web site consistent with disclosed embodiments.

Processor 602 may include one or more known processing devices, such as mobile device microprocessors manufactured by Intel™, NVIDIA™, or various processors from other manufacturers. The disclosed embodiments are not limited to any specific type of processor configured in client devices 150.

Memory 610 may include one or more storage devices configured to store instructions used by processor 602 to perform functions related to disclosed embodiments. For example, memory 610 may be configured with one or more software instructions, such as programs 612 that may perform operations when executed by processor 602. The disclosed embodiments are not limited to separate programs or computers configured to perform dedicated tasks. For example, memory 610 may include a single program 612 that performs the functions of the client devices 150, or program 612 may include multiple programs. Memory 610 may also store data 616 that is used for generating data streams. That is, memory 610 may include instructions to send sequence of data packets requesting transaction approval or content to service system 105. Memory 610 may also include a client application 614.

In certain embodiments, memory 610 may store instructions for accessing service system 105. For example, memory 610 may include an application that communicates with service system 105 via TCP/IP. Moreover, other software components may be configured to request information from service system 105 or determine the location of client devices 150. For instance, these software instructions, when executed by processor(s) 602 may process information to display the status of a transaction.

I/O devices 604 may include one or more devices configured to allow data to be received and/or transmitted by client devices 150 and to allow client devices 150 to communicate with other machines and devices, such as other components of system 100. For example, I/O devices 604 may include a screen for displaying optical payment methods such as Quick Response Codes (QR), or providing information to the user. I/O devices 604 may also include components for NFC communication. I/O devices 604 may also include one or more digital and/or analog devices that allow a user to interact with client devices 150 such as a touch-sensitive area, buttons, or microphones. I/O devices 604 may also include one or more accelerometers to detect the orientation and inertia of client devices 150. I/O devices 604 may also include other components known in the art for interacting with service system 105.

In some embodiments, client devices 150 may also include a camera 620 that capture images and may be used for biometric authentication processes, such as facial recognition. Additionally, or alternatively, client devices 150 may include a fingerprint sensor 630 that allows users to unlock client devices 150 and/or perform authentications. Both camera 620 and fingerprint sensor 630 may be operated by processor 602 and use encryption security to make it impossible for users to externally access fingerprint or camera information.

The components of client devices 150 may be implemented in hardware, software, or a combination of both hardware and software, as will be apparent to those skilled in the art.

Figure 7:
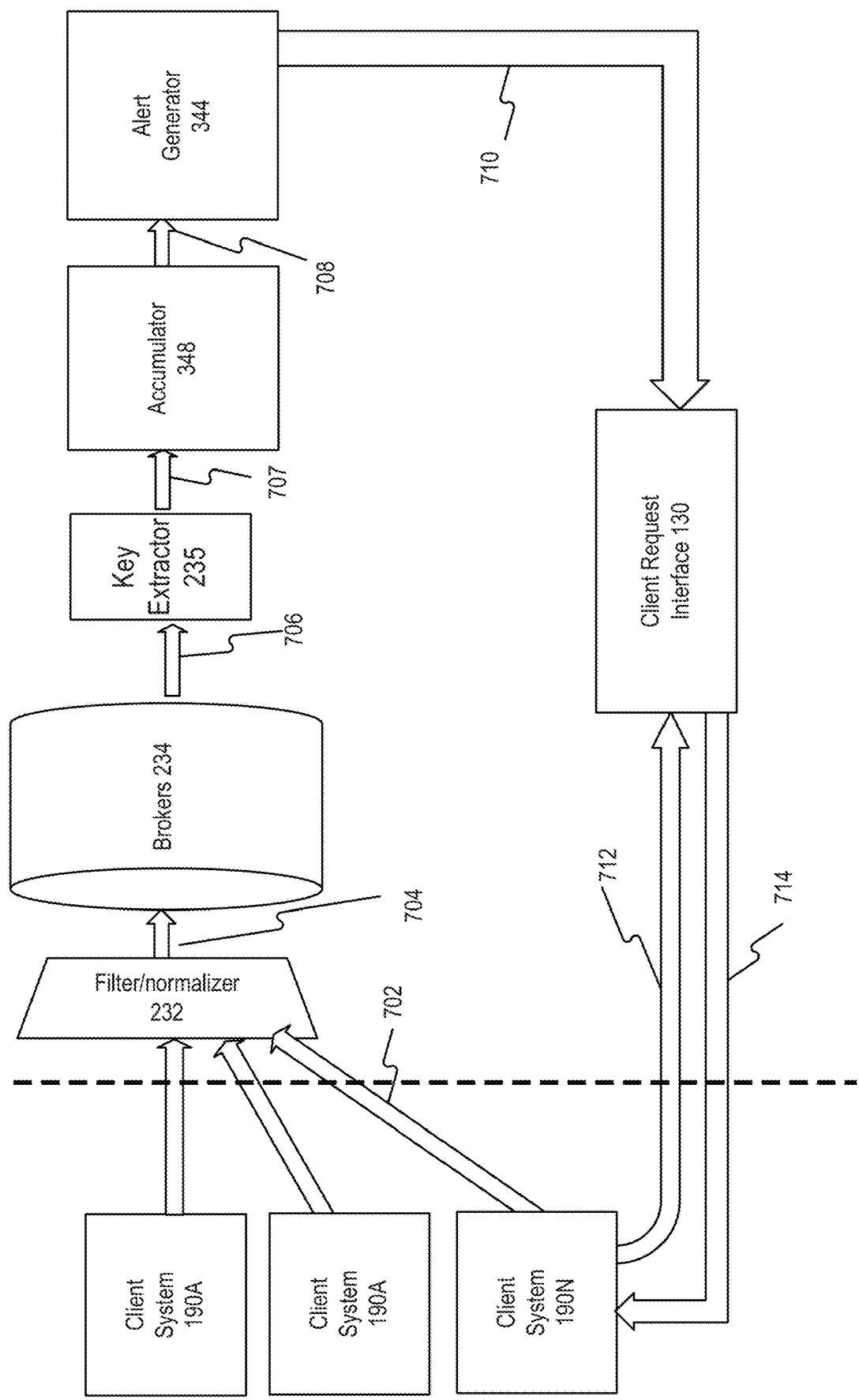
FIG. 7 is an exemplary process flow diagram illustrating a data stream processing flow, consistent with disclosed embodiments.

Referring now to FIG. 7, there is shown a process flow diagram illustrating data stream processing flow 700, consistent with disclosed embodiments. In some embodiments, as shown in FIG. 7, different elements of system 100 (FIG. 1) may perform specific steps of flow 700. For example, components of service system 105 may perform one or more steps but other systems, such as client systems 190, may perform other steps. In other embodiments, however, alternative elements of system 100 may perform the described steps or a single element of system 100 may perform one or more of the described steps.

In step 702, client system 190 may transmit data streams to service system 105. The data streams may include transaction requests, purchase orders, or similar messages to interact with service system 105. The data streams may include sequences of packets arranged according to different communication protocols. For example, some of the data streams in step 702 may be TCP communications but other data streams may be UDP communications.

In step 704, filter/normalizer 232 may generate one or more output data streams after filtering and normalizing events in data streams. As further discussed in connection with FIG. 2, filter/normalizer 232 may receive one or more data streams as inputs and apply operators to generate an output data stream that has limited fields or that removes events that cannot be used for predictive models or abnormalities detection. Additionally, or alternatively, in step 704 filter/normalizer 232 may generate a filtered data stream with events having a uniform format or modified values to match a standard. Further, in step 704 filter/normalizer 232 may perform operations for identifying events that do not include an associated event time, deleting events without associated event time, and normalizing event information of undeleted events by normalizing time zone of event times and currency of the events.

In step 706, brokers 234 may accept incoming data streams and sort them in downstream data when requested. For example, in step 706, brokers 234 may generate topics for different events in data streams and issue timers or callbacks for events based on time stamps. In step 707, key extractor 235 may process data streams to extract keys, identify associated accounts, and locate or generate state variables that are associated with the accounts. Extraction of key/value pairs in step 707 may be pre-defined according to one or more real-time processing requirements.

In some embodiments, as further described in connection with FIG. 15, filter/normalizer 232 may operate after brokers 234. For instance, in embodiments where messages in the data stream from step 702 is pre-defined and agreed upon between sender and receiver, filter/normalizer 232 may be positioned after brokers 234. Then, a user may choose topics/messages to consume in runtime using filter/normalizer 232. In yet other embodiments, filter/normalizer 232 may be positioned after brokers 234.

In step 708, the processed data streams may be used to modify or update state variables by accumulator 348. For example, accumulator 348 may modify state variables by aggregating the influence of processed events. In such embodiments, when a new transaction event is processed by service system 105 accumulator may add the value of the transaction to a state variable in step 708. Variables may be updated without increasing their complexity so they continue to be operable with O(1) complexity operations and/or be accessible with a constant time complexity. For example, accumulator 348 may keep state variables to a single dimension so any operation that involves state variables does not increase computation complexity and can be resolved in an uniform amount of time. In such embodiments, state variables that are configurable to be accessed with O(1) complexity operators may include, for example, an array, a fixed-size stack, or a fixed-size queue. These variable arrangements can be accessed with operators that access state variables in a uniform amount of time may regardless of the input size. For example when state variables include arrays the O(1) operator may be accessing an element of the array. In such embodiments, the state variable may be a single value variable having an array with a unique position that can be accessed with O(1) complexity functions such as "get(array(0))." Alternatively, or additionally, state variables may include architectures of fixed-size stack that may be accessed with O(1) complexity operators such as push and pop operators. Moreover, state variables may include a fixed-size queue that can be accessed in a uniform amount of time (i.e., runs in constant time regardless of the input size) using operators such as enqueue and dequeue operators. Therefore, in step 708 accumulator 348 may aggregate events in state variables but maintain the ability of quickly capturing information from the variables by maintaining O(1) complexity accessibility. For example, accumulator 348 may add or subtract the influence of events to the single value stored in the state variable.

Further, in step 708 accumulator 348 may eliminate the influence of events that are outside an influence window. For example, when triggered by a new event accumulator 348 may add the new event in the state variable and also determine if certain events should be removed. Accumulator 348 may identify events that for that variable are outside a time window based on, for example, time stamps or callback functions. By limiting accumulator 348 operations to only when a triggering event affects the corresponding state variable, it is possible to minimize utilization of accumulator 348 and minimize hardware utilization to improve efficiency of computer operations.

In step 710, fraud/risk detection service 344 may determine whether the status of one or more state variables should generate an alert for an associated account. For example, when a state variable accumulating a series of events over a period of time goes above a threshold value, fraud/risk detection service 344 may identify suspicious behavior and generate an alert for the account associated with the accumulation or state variable. In some embodiments, in step 710 fraud/risk detection service 344 may trigger the alerts based on results from predictive model estimations that take into account multiple state variables, which may accumulate different values or different parameters.

Also in step 710, fraud/risk detection service 344 may communicate the alert to client request interface 130. In response to an alert signal, client request interface 130 may modify instructions for API manager 444 and limit accessibility to service system 105 for accounts associated with the alert. For example, in step 710 service system 105 may updated registers and customize fields in API manager 444 to modify instructions and limit accessibility. Further, in step 710 service system 105 may add links to API responses and/or register CURIEs (or Compact URIs) to modify the behavior of the response depending on client systems 190 request.

Steps 702-710 may be performed in real-time to constantly monitor data streams from client systems 190. Using state variables accumulating series of events over a period of time facilitate real-time evaluation of trends, reduce the number of required calculations, and relax hardware requirements. By maintaining an accumulator for multiple keys extracted from events in data streams, it is possible to quickly and efficiently determine if a series of events may be associated with fraudulent or abnormal activity.

Flow 700 may also include a step 712, in which client systems 190 request a transaction from service system 105 using an API. In some embodiments, other elements of system 100 may request information or services from service system 105. For example third party systems 160 may also request information from service system 105 by contacting client request interface 130. Once client request interface 130 receives the message from an outside domain, client request interface 130 may identify an account associated to the message and determine whether the account is associated with an alert. If the account is associated with an alert, client request interface may reply with a decline or a warning message in step 714. However, if the API request is not associated with an account under an alert, client request interface 130 may respond with an approval to client systems 190 (or the element in system 100 that sent the request).

Thus, alerts generated in the real-time processing flow of steps 702-710 may be used to prevent further transactions from a compromised account by notified and modifying elements in service system 105 that handle API requests and/or interact with client systems 190. Moreover, in some embodiments, client request interface 130 may notify real-time state calculator 120 that new data streams may be coming and are associated with the identified account. With this arrangement system 105 may reduce the number of times it needs to search or identify client accounts.

Figure 8:
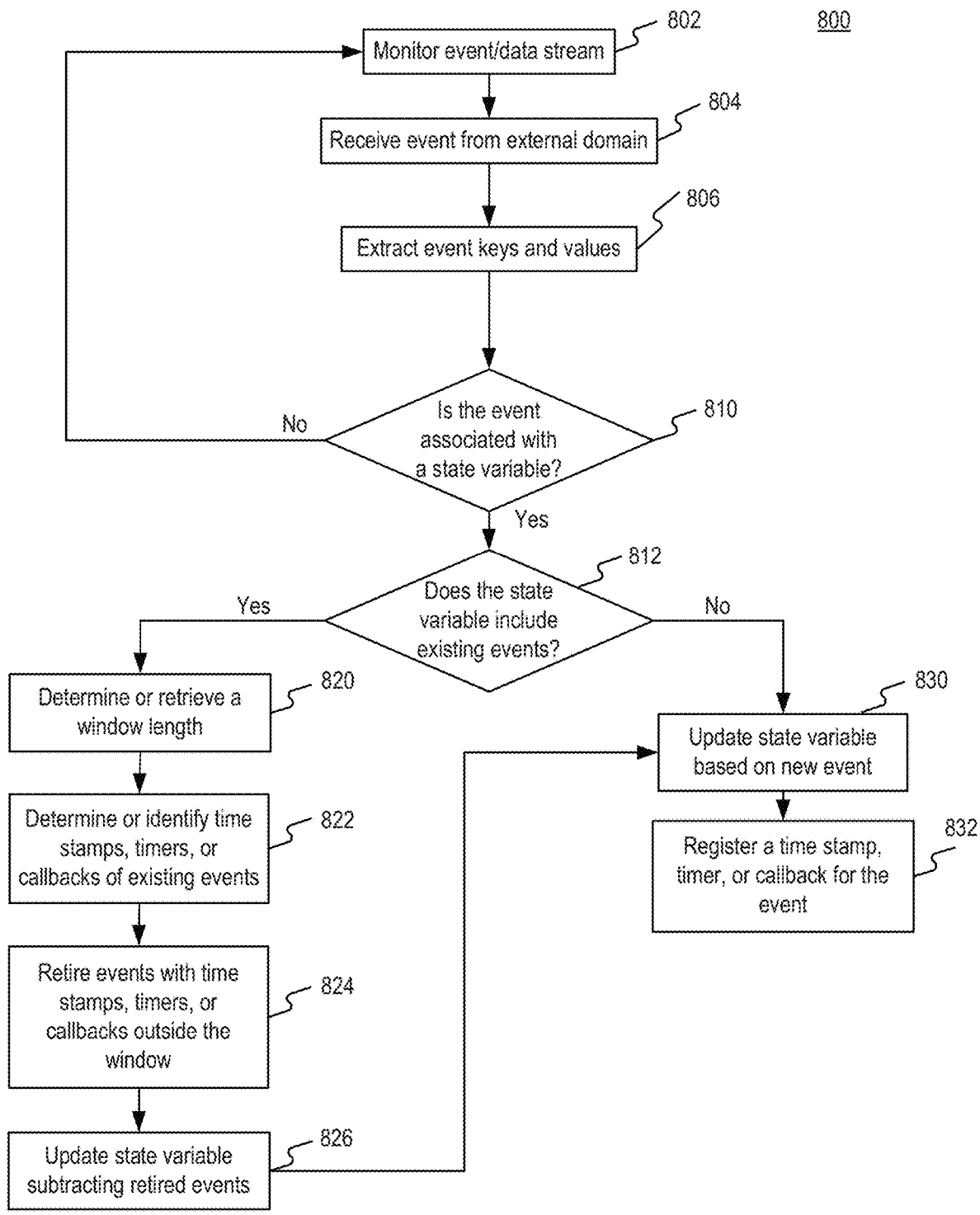
FIG. 8 is an exemplary flow chart illustrating an alert generation process, consistent with disclosed embodiments.

Referring now to FIG. 8, there is shown a flow chart describing an alert generation process, consistent with disclosed embodiments. Process 800 may be carried out by service system 105 in real-time in response to receiving data streams from client systems 190 and/or other networked elements of system 100. For example, process 800 may be carried out by stream operator 110 and real-time state calculator 120 in real-time as events in data streams are being received.

In step 802, service system 105 may be monitoring event data streams. As further described in connection with FIG. 11, to monitor event data streams service system 105 may configure stream capture applications and/or setup a Kafka cluster. Data streams may include transactions, service requests, information requests, purchase orders, among other interactions with service system 105.

In step 804, service system may receive and/or identify an event from an external domain or server. The identified event may be part of the data streams monitored in step 802. The event may be for example a transaction request include electronic payment information, a merchant, product(s), and an amount.

In step 806, service system may extract event keys and values from the received event. The extracted keys may include the extracted keys include at least one of an IP address, an email address, or a phone number.

However, as further described in connection with FIG. 11, alternative methods of key/value pair extraction may also be possible. Moreover key extraction In step 806 may be based on a group of pre-defined topics. The pre-defined topics may include characteristics of the transaction such as transaction amount, transaction location, account information, among others. In some embodiments, step 806 may also include extracting values to generate value arrays.

In step 810, service system 105 may determine if the event is associated with a state variable. Service system 105 may identify state variables associated with the account of step 808 using look-up tables or similar data structures. The state variable may be configured to be accessed with constant time complexity. For example, using operators with O(1) complexity that run in constant time regardless of the input size.

In some embodiments, service system 105 may determine if keys in the event should modify state variables related to the account identified in step 808. For example, if the event is a transaction and includes an amount that is being monitored with a state variable, then service system 105 may determine the event is associated with a state variable (step 810: yes). However, if the event is a request for new account, or a forgotten password request, service system 105 may determine the event is not associated with a state variable (step 810: no). Further, if the identified account in step 808 does not relate to any state variables, then service system 105 may also determine the event is not associated with a state variable (step 810: no).

If service system 105 determines the event is not associated with a state variable (step 810: no), process 800 may return to step 802 and continue the monitoring data streams to capture a following triggering event. However, if service system 105 determines the event is associated with a state variable (step 810: yes), process 800 may continue to step 812, where service system 812 determines if the identified state variable includes existing events.

If the identified state variable includes existing events (step 812:yes), processor 820 may continue to step 820 and determine or retrieve a window length. The window length may be predefined for state variables and it could be a time window or a number of events window. For example, the window may be a 30 min window, a 30 second window, a 24 hour window, or different combinations. Alternatively, or additionally, the window length may be based on a number of transactions. When state variables only have capacity to consider, for example, 100 events, when event 101 is processed it may delete event 1 because it would fall outside the window. Such arrangements may allow enforcing O(1) complexity operations and reduce latency.

Service system 105 may continue to step 822 and determine or identify recorded time stamps, timers, of callbacks for existing events influencing the state variable. For example, when updating a state variable accumulator 348 (FIG. 3) may register a timer or callback to retract events from accumulation state variables when the event expires. Thus, in step 822, service system 105 may identify the recorded timer or timestamps.

In step 824, service system 105 may retire events with time stamps, timers, or callbacks outside the window determined in step 820. For example, when events have expired (e.g., the time stamp is outside the window), service system may determine the state variable should be updated to remove the influence from the expired event. In step 826, service system 105 may update the state variable by removing the influence of expired events. For example, service system 105 may update state variables by subtracting retired events. Alternatively, or additionally, step 824 may include a sequence of retrieving a time stamp for existing events accumulated in the state variable and deleting existing events with a time stamp older than a lower bound of the time window.

When the identified state variable does not include existing events (step 812: yes) or once the state variable is updated to remove influence of expired events (after step 826), process 800 may continue to step 830 in which service system 105 may update the state variable based on the new or triggering event. For example, service system 105 may accumulate the influence of the triggering event by adding on to the state variable proportionally to an event amount or value. Therefore, in some embodiments, process 800 may result in updating state variables by accumulating a triggering event in the state variable, registering a time stamp for the event in the state variable, and retiring expired events from the state variable. Moreover, in some embodiments the increment to the state variable based on the triggering event may be proportion to a value in the triggering event. Thus, in step 830 service system 105 may perform operations of assigning a score to the event proportional to the transaction value and increasing the value of the state variable based on the assigned score.

In step 832, service system 105 may register a time stamp, timer, or callback for the influence of the triggering event in the state variable.

Figure 9:
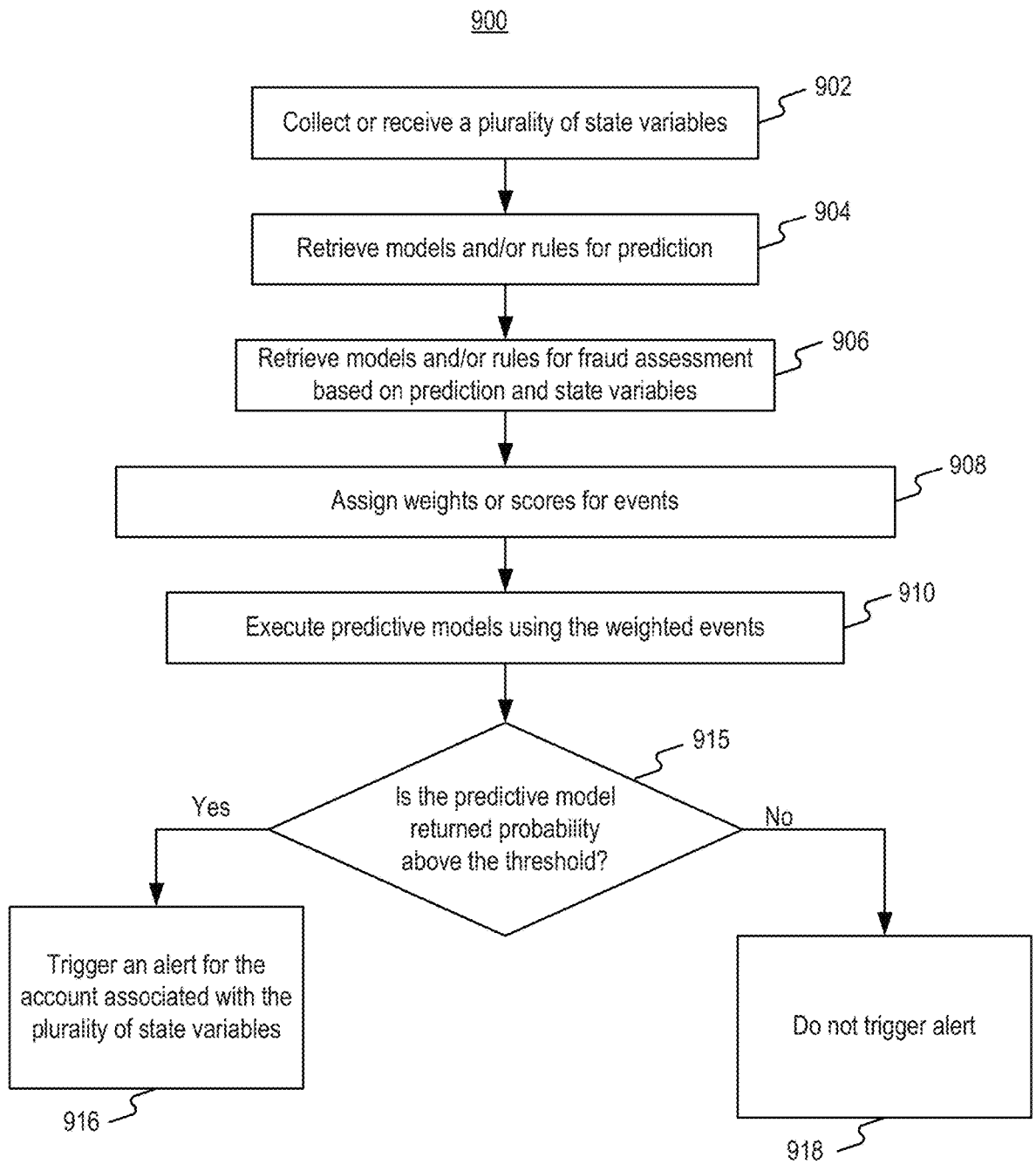
FIG. 9 is an exemplary flow chart illustrating a multi-variable alert generation process, consistent with disclosed embodiments.

Referring now to FIG. 9, there is shown a flow chart illustrating a multi-variable alert process 900, consistent with disclosed embodiments. Process 900 may be carried out by service system 105 when monitoring data streams. For example, process 900 may be carried out by real-time state calculator 120 with keys and values extracted from events in data streams.

In step 902, service system 105 may collect or receive a plurality of state variables. These state variables may be configured to be accessed using operators with O(1) complexity. For example, collected variables in step 902 may be single-dimension arrays or fixed length stacks. Further, the variables in step 902 may represent different keys extracted during key/value pair extraction from events. For example, state variables of step 902 may include transaction amount accumulator, frequency of transactions, transaction origin, or similar parameters that can be associated with electronic transactions. Alternatively, or additionally, step 902 may include retrieving a plurality of state variables associated with the account from a database, where each of the plurality of state variables being configured to be accessed with O(1) operators (operators with an algorithm that run in constant time regardless of the input size such as array: accessing any element).

In step 904, service system 105 may retrieve models and/or rules for multi-variable predictions based on the state variables. For example, service system 105 may retrieve random forest and/or neural network models from predictive model generator 342 (FIG. 3) to process a plurality of state variables. Because variables can be accessed with low complexity operators, the predictive models can run quickly and deliver predictions. Models retrieve in step 904 may be developed off-line or on-line. For example, models of step 904 may be generated by service system 105 off-line, based on previously collected events, but may be implemented for on-line operation once they achieve a desired accuracy based on validation datasets.

In step 906, service system 105 may retrieve models or rules for fraud assessment. For example service system 105 may retrieve from calculator memory 350 one or more rules relating to threshold probabilities or accumulated amount that can be correlated with fraud probability. In some embodiments, the rules for fraud assessment may specify the threshold values that indicate potential fraud.

In step 908, service system 105 may assign weights or scores for events in the data streams. For example, service system 105 may perform operations of assigning weights to events with extracted keys. In some embodiments, certain variables may be more indicative of fraud than other variables. For example, events associated to amount spent in transactions may have a higher predictive value than events of types of transactions because amount spent may be more indicative of fraud than the type of transactions. In contrast, other events related to parameters like merchant type or currency may be less relevant for the fraud inquiry. Thus, service system 105 may add weights to different events based on the type of prediction or assessment that is being performed, assigning a higher weight to highly relevant events and a lower weight to less relevant transactions. The weighting assignment to events in step 908 may be based on processes further described in connection with FIG. 12.

In step 910, service system 105 may perform real-time analysis of the data streams using the retrieved models of steps 904-906 with the modified variables of step 908. In such embodiments, service system 105 may compute a prediction or fraud probability based on the modified state variables. For example, service system 105 may compute a probability of fraud using a predictive model in step 910, where the predictive model including at least one of a random forest or a convolutional neural network.

In step 915, service system 105 may determine whether the predictive model returned a probability above a defined threshold. For example, fraud/risk detection service 344 may monitor in real-time the results from step 910 to identify whether one of the estimated probabilities of fraud or abnormality is above a threshold. If service system 105 determines that the estimated probability is above a threshold (step 915: yes), process 900 may continue to step 916 and trigger an alert for the account associated with the plurality of analyzed variables. However, if service system 105 determine the estimated predictive models did not result in a probability above the defined threshold (step 915: no), process 900 may continue to step 918 and will not trigger an alert. The low accumulative configuration of the variables permits the allocation of resources for different streams seamlessly, relaxing hardware requirements for real-time processing and predictive model generation.

Figure 10:
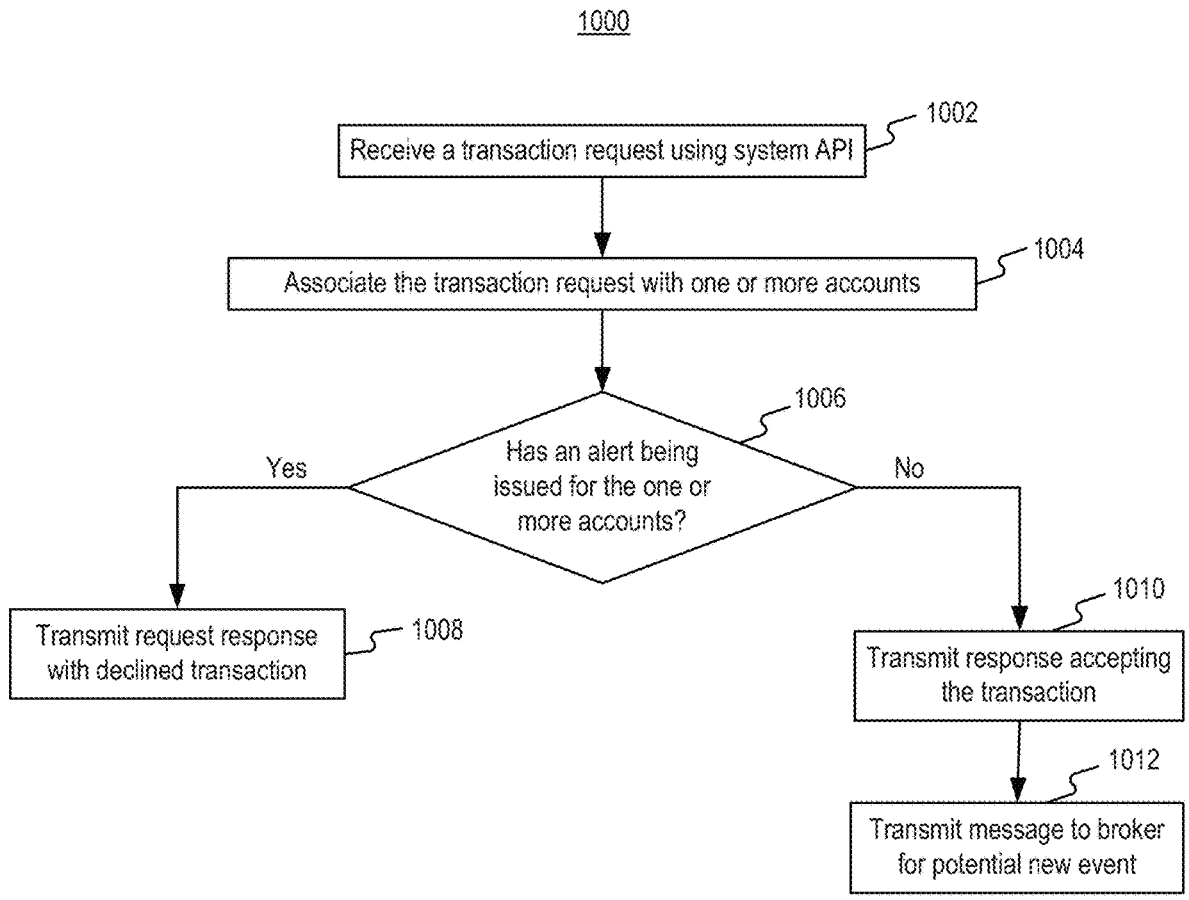
FIG. 10 is an exemplary flow chart illustrating a response to client request process, consistent with disclosed embodiments.

Referring now to FIG. 10, there is shown flow chart illustrating a response to client request process 1000, consistent with disclosed embodiments. Process 1000 may be carried out by service system 105 when receiving a request from, for example, client systems 190 or client devices 150. For example, process 1000 may be carried out by client request interface 130, which may interact with components of system 100 via network 170.

In step 1002, service system 105 may receive a transaction request using an API. For example, a client system 190 may send a request to service system 105 using an API supported by API manager 444 (FIG. 4). The request may include any of an authorization request, a purchase order, or a request for information.

In step 1004, service system 105 may associate the request of step 1002 with an account or client. For example, service system 105 may correlate information in the request with client registration information 446 or may query interface memory 430 (FIG. 4) to associate the request with one or more accounts.

In step 1006, service system 105 may determine whether an alert has been issued for the one or more accounts identified in step 1004. For example, client authenticator 442 (FIG. 4) may determine whether fraud/risk detection service 344 (FIG. 3) has generated an alert for the account associated with the request from step 1002. If the account has been associated with an alert (step 1006: yes), process 1000 may continue to step 1008, and service system 105 may transmit a response to the client system 190 declining the transaction or request. With this arrangement, service system 105 may be able to capture in real-time suspicious behavior while at the same time configuring API's and interfacing elements to prevent further interaction with the compromised account. However, if in step 1006 service system determines that the account has not been associated with an alert (step 1006: no), process 1000 may continue to step 1010 and transmit a response to client systems 190 accepting the transaction.

In some embodiments, process 1000 may include step 1012, in which service system 105 may transmit a message to brokers 234 (FIG. 2) that an upcoming event may be added to the stream and that the event is associated with the identified account. When a transaction or request is approved in step 1010 it may result in a new event being generated for the data stream associated with the client system 190 that received the approval. Thus, to reduce additional processing steps and reduce computation complexity, in step 1012 service system 105 may notify brokers 234 or other elements of real-time state calculator 120 (FIG. 1) that a new event associated with the identified account may be generated. In response, brokers 234, or other elements of real-time state calculator 120, may initialize a topic or workflow for the new potential event.

Figure 11:
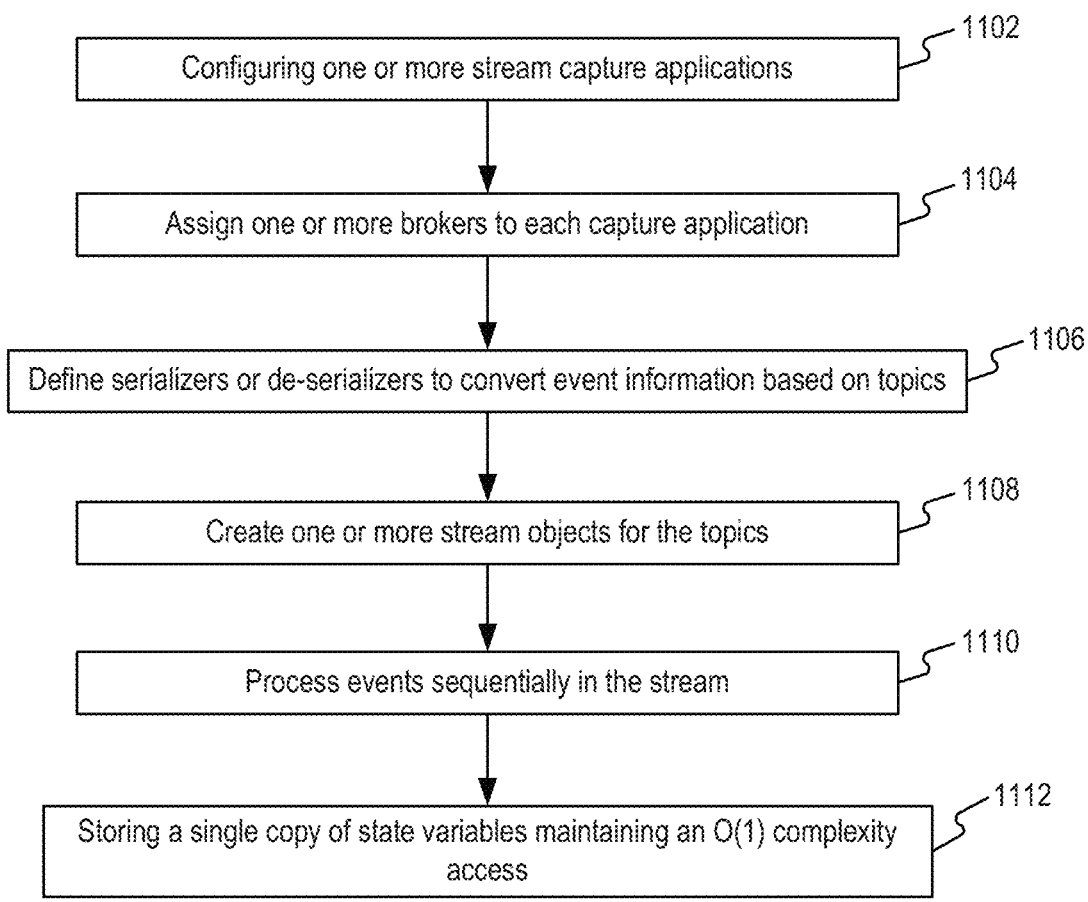
FIG. 11 is an exemplary flow chart illustrating a stream capture configuration process, consistent with disclosed embodiments.

Referring now to FIG. 11, there is shown a flow chart illustrating an exemplary stream capture configuration process 1100, consistent with disclosed embodiments. Process 1100 may be carried out by service system 105 in real-time while processing events in data streams that are generated by, for example, client systems 190 or client devices 150. For example, process 1100 may be carried out by stream operator 110.

In step 1102, service system 105 may configure one or more stream capture applications. Configuring the stream capture applications may include creating a Java instance, setting up parameters, and constructing instance parameters. For example, in step 1102 service system 105 may perform operations such as:

```
import java.util.Properties;
import org.apache.kafka.streams.StreamsConfig;
Properties settings = new Properties( );
settings.put(StreamsConfig.APPLICATION_ID_CONFIG,
"my-first-streams-application");
settings.put(StreamsConfig.BOOTSTRAP_SERVERS_CONFIG, "kafka-broker1:9092");
settings.put(... , ...);
StreamsConfig config = new StreamsConfig(settings);
```

The parameters selected for the configuration of the stream capture applications in step 1102 may include required configuration parameters such as "application.id" and "bootstrap.servers". Additionally, or alternatively, the parameters for configuration in step 1102 may include "default.deserialization.exception.handler," "default.production.exception.handler," "default.key.serde," "default.value.serde," "num.standby.replicas," "num.stream.threads," "partition.grouper," "processing.guarantee," "replication.factor," and "timestamp.extractor." Moreover, parameters for configuration of the capture applications may include producer configuration parameters (e.g., "Naming, Default Values, enable.auto.commit, rocksdb.config.setter") or Recommended configuration parameters for resiliency (e.g, "replication.factor").

Configured capture applications may specifically capture certain types of events, identify keys, and determine key/value pairs that can be used for real-time processing. Alternatively, or additionally, in step 1104 service system 105 may perform a sequence of operations including: configuring one or more stream capture applications; assigning one or more brokers to each capture application; and defining in each broker to convert event information into variables accessible with O(1) operators.

In step 1104, service system 105 may assign one or more brokers 234 (FIG. 2) to each capture application. For example, service system 105 may check current partition assignments for brokers 234 to determine their workload. To do so, service system 105 may employ scripts to identify broker 234 arrangement. Service system 105 may also continue to assign capture applications based on partitions by reassigning elements based on partitions using scripting langue to format, for example, a "reassign-partitions.json" file.

In step 1104, service system 105 may also run the reassignment of topics to replica brokers 234 for more resilient calculations and may verify the assignment.

In step 1106, service system 105 may define serializer or de-serializer to convert information in events based on created topics during assignments of brokers 234 in step 1104. For example, service system 105 may execute the following commands to setup serializers and de-serializer that process in real-time data streams:

```
public class User {
    private String clientID;
    private int amount;
    public User( ) {
}
public User(String clientID, int amount) {
this.clientID = clientID;
this.amount = amount;
}
public String getclientID( ) {
return this.clientID;
}
public int getamount( ) {
return this.amount;
}
```

```
@Override public String toString( ) {
return "User(" + clientID + ", " + amount + ")";
}
@Override public byte[ ] serialize(String arg0, User arg1) {
    byte[ ] retVal = null;
    ObjectMapper = new ObjectMapper( );
    try {retVal = objectMapper.writeValueAsString(arg1).getBytes( );
    }
```

In step 1108, service system 105 may create one or more stream objects for topics in resulting from assignment of brokers 234 in step 1104. The object created in step 1108 may be based on data streams. For example objects created in step 1108 may share a single producer instance. Objects may be created with functions to define objects. For example, in step 1108 service system 105 may employ a "ObjectRecord(java.lang.String topic, java.lang.lnteger partition, K key, V value)" to generate key/value pair object and create a record to be sent to a specified topic and partition of brokers 234. Alternatively, or additionally, service system 105 may employ a command of "ObjectRecord(java. lang. String topic, K key, V value)" to create a record to send to stream operator 110 and/or a real-time processor, such as Kafka. Further, in step 1108 service system 105 may create stream objects using commands such as "ObjectRecord (java.lang.String topic, V value)" to create a record with no key.

In step 1110, service system 105 may process events sequentially in the stream. Based on the key/value pairs and the topic configuration and partition, the process may be performed efficiently by using parallelized brokers 234 based on different topics. In step 1110, processing may be performed in parallel by using partitions of data that can be processed concurrently without a defined order.

In step 1112, service system 105 may associate the key/value events with an account and their related state variables. The state variables may be updated based on the key/values and service system 105 may store a single copy of state variables, to minimize memory utilization, and configure variables to enforce the ability to access them using operators with O(1) complexity. Thus, in step 1112, after configuring capture applications and processing sequentially events, service system 105 may store low complexity state variables that monitor data streams.

Figure 12:
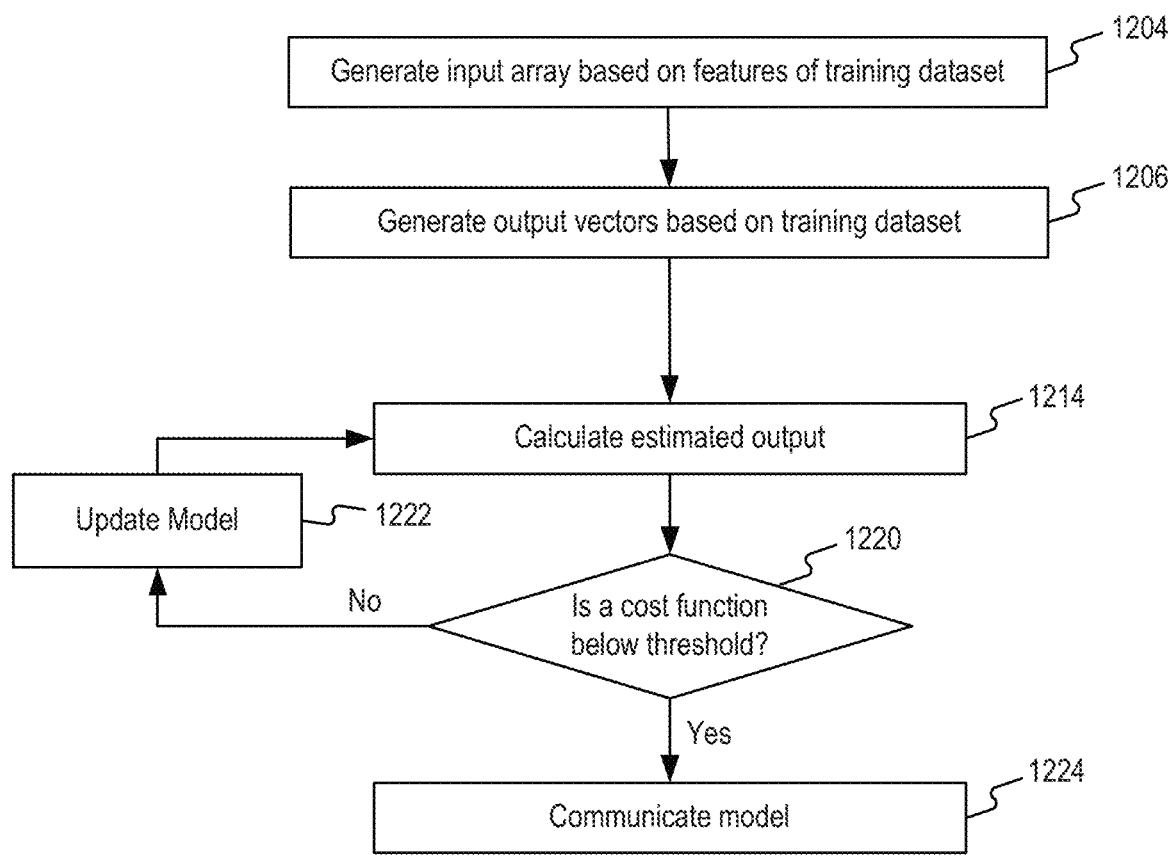
FIG. 12 is an exemplary flow chart illustrating a predictive model configuration process, consistent with disclosed embodiments.

Referring now to FIG. 12, there is shown a flow chart illustrating a predictive model configuration process 1200, consistent with disclosed embodiments. Process 1200 may be performed by service system 105. For example, process 1200 may be executed by predictive model generator 342 in calculator processor 340 (FIG. 3) and may be configured to generate prediction models, using for example, convolutional neural networks to correlate variables.

In step 1204, service system 105 may generate an input array based on features of the training data set. In step 1206, service system 105 may generate output vectors based on key/values of the training data set.

In step 1214 service system 105 may calculate an estimated output and a cost function. In step 1220, service system 105 may determine whether the cost function is below a threshold of required accuracy, which may be specified by the user. If service system 105 determines that the cost function is not below a threshold and the required accuracy has net being achieved, service system 105 may continue to step 1222 and update the model. However, if the cost function if below a threshold (step 1220: yes), service system 105 may accept the model and communicate it in step 1224.

Figure 13:
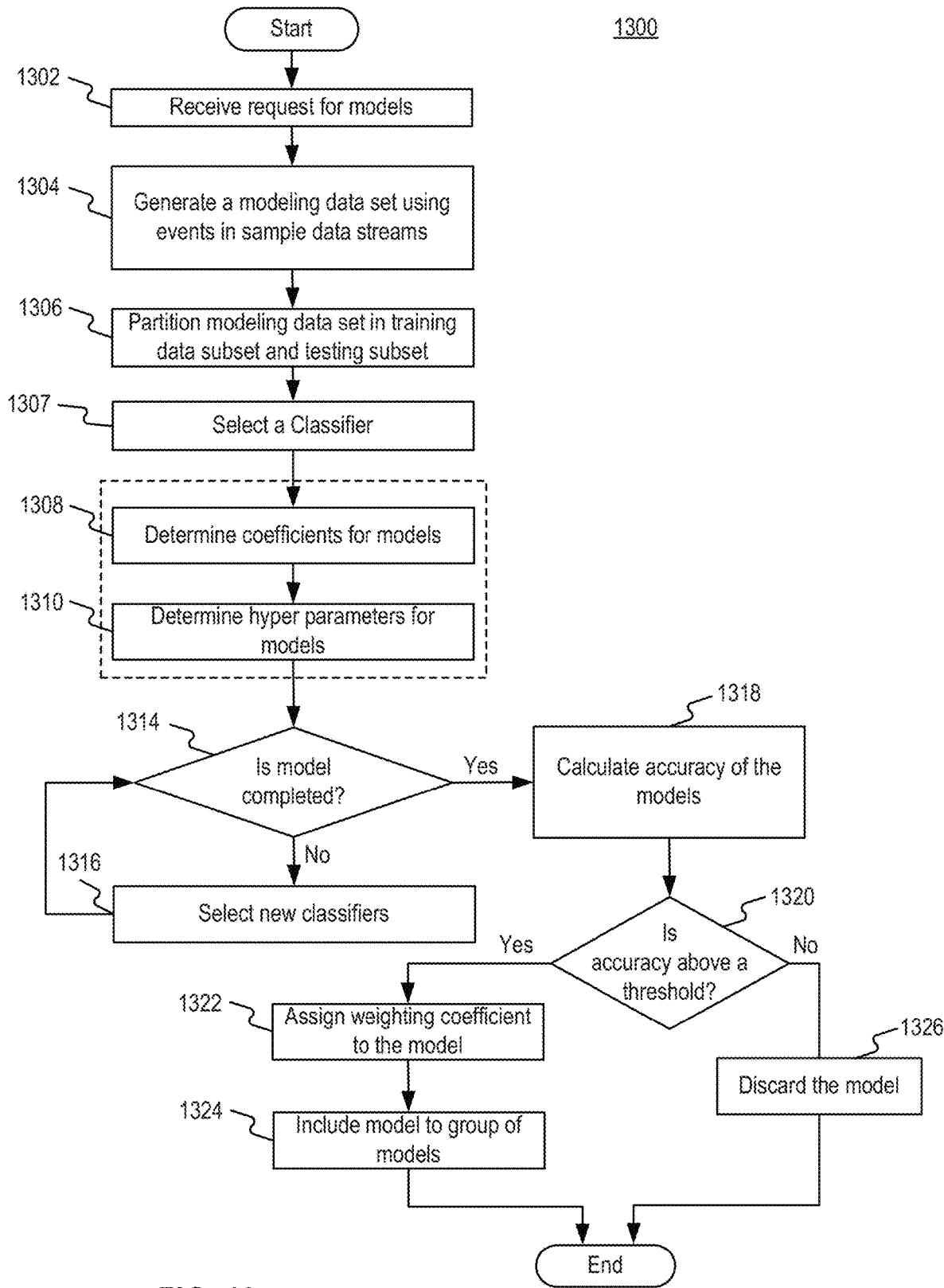
FIG. 13 is an exemplary flow chart illustrating a predictive model training process, consistent with disclosed embodiments.

FIG. 13 is an exemplary flow chart illustrating a predictive model training process 1300, in accordance with disclosed embodiments. In some embodiments, service system 105 may carry out process 1300. For example, real-time state calculator 120 may perform process 1300.

In step 1302, service system 105 may receive a request for prediction models. In some embodiments, the request may specify a target state variable or a specific client system 190. The request may include information about client devices 150.

In step 1304, service system 105 may generate a modeling data set. Service system 105 may generate the training data set using information from databases 180, online resources 140, and/or client devices 150. For example, service system 105 may retrieve, from databases 180, transactions and events associated with an account that a user of a client device 150 reported as fraudulent.

In step 1306, service system 105 may create modeling data subsets by dividing modeling data sets generated in step 1304. In some embodiments, service system 105 may divide the training data set randomly creating random training subsets and testing subsets. Then, prediction models may be generated using the randomly selected subsets of the modeling data set. Elements in the training data subsets may be unique to each subset to create independent training data subsets. Alternatively, training data subsets may share elements and overlap. In other embodiments, service system 105 may divide the training data set using division rules. The training data set division rules may indicate the number of divisions and/or ratios between different groups. For example, the training data set may be divided using an 80/20 split for testing and validation data.

Based on the modeling data set partitioning, service system 105 may select a classifier in step 1307. Service system 105 may also process the modeling data set of step 1306 to determine coefficients (step 1308) and hyper parameters (step 1310) for a prediction model. The prediction models may be parametric, non-parametric, or semi-parametric. In some embodiments, service system 105 may create a plurality of decision trees as prediction models to identify a probability of fraud. In other embodiments, service system 105 may generate neural networks (as further described in connection to FIG. 12), Group Method of Data Handling (GMDH) algorithms, Naive Bayes classifiers, and/or Multivariate Adaptive Regression Splines.

In step 1314, service system 105 may evaluate if the model is completed or if it has reached a stopping criteria. For example, when service system 105 generates decision trees, in step 1314 service system 105 may evaluate if a stopping criteria is fulfilled for the end nodes. In some embodiments, stopping criteria may be intrinsic to the model or defined by hyper parameters.

If the stop criteria in not fulfilled, service system 105 may continue to step 1316 and select a new variables or parameters to determine new classifiers. Alternatively, when the stop criteria is fulfilled, service system 105 may continue to step 1318, in which service system 105 may calculate the accuracy of the model using a portion of the training data set.

In step 1320, service system 105 may evaluate whether the accuracy for the model is above an accuracy threshold. In some embodiments, the accuracy threshold for the model may be automatically adjusted based on optimization objectives set for the prediction models. If the model is not above the threshold (step 1320: no) the model may be discarded in step 1326. If the calculated accuracy is above the threshold (step 1320: yes), service system 105 may assign a weighted coefficient to the model in step 1322 and include the model to the set of models in step 1324. The weighted coefficient may associated with the calculated accuracy. For example, the weighted coefficient may be proportional to the accuracy.

Process 1300 may be repeated a plurality of times to generate a plurality of models. In some embodiments, service system 105 may repeat the process until a minimum of models is generated.

Figure 14A:
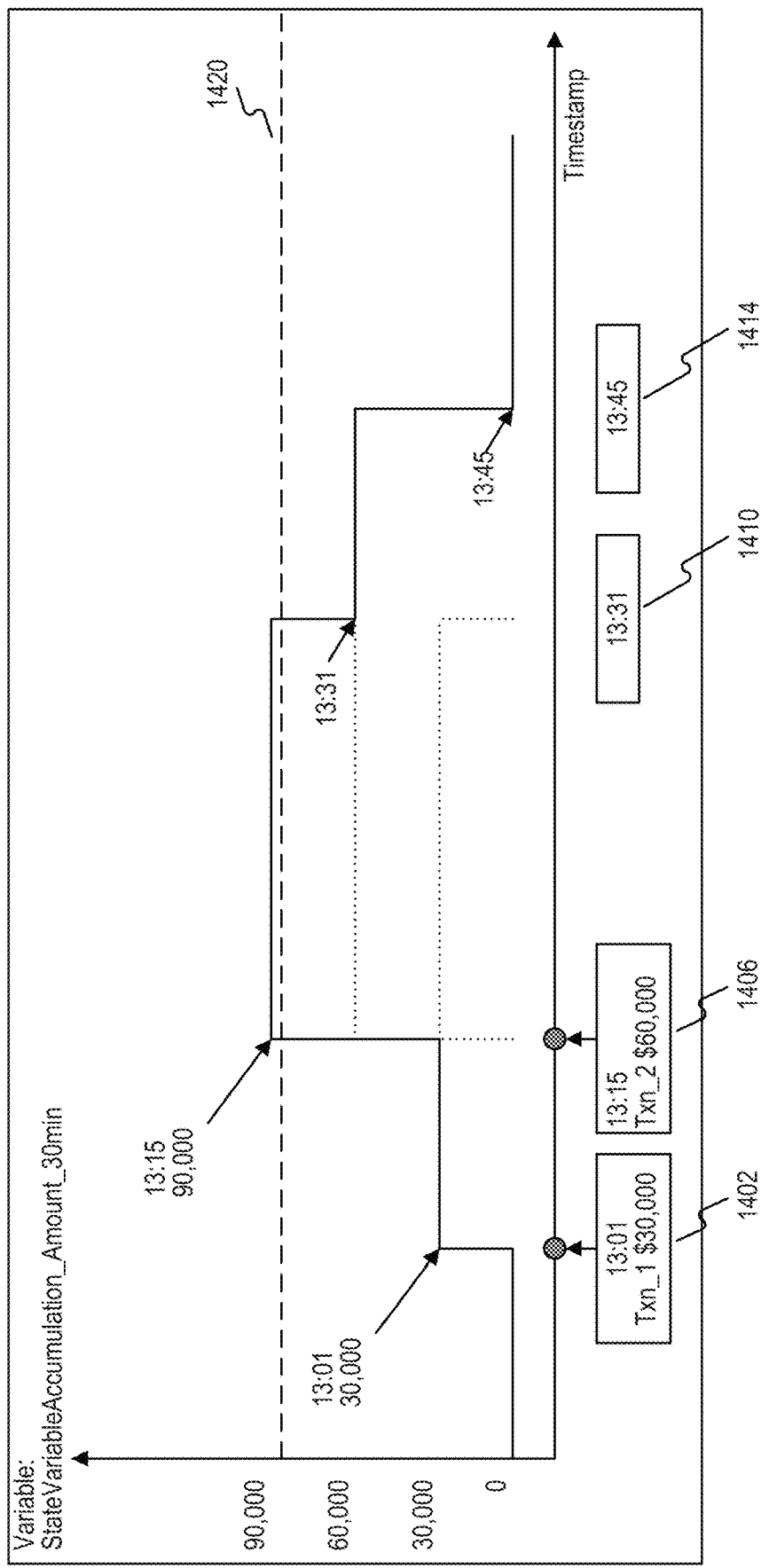
FIG. 14A is an exemplary graph of the value of a first exemplary state variable as a function of time, according with disclosed embodiments.

FIG. 14A shows a graph of the value of an exemplary state variable as a function of time, according with disclosed embodiments. The state variable depicted in FIG. 14A may be configured to accumulate transaction value (e.g., the amount spent in a transaction). Further the state variable may be configured to remove the influence of events when they are older than 30 mins. Moreover, because the state variable described in FIG. 14A stores a single value, the time complexity is constantly O(1), regardless of whether it monitors a long or a short term.

FIG. 14A shows that the state variable changes four times as a function of time. In time 1402, the state variable changes from 0 to $30,000. This change may occur when an event in a data stream triggers a change in the state variable. For example, stream operator 110 may extract key/values from events that are associated with an account. In turn, the account is associated with the state variable depicted in FIG. 14A. Therefore, real-time state calculator 120 may update variables associated with the identified account according to the triggering event. In this case the triggering event included a transaction for $30,000 and the state variable is updated. For example accumulator 348 may update the variable when receiving a triggering event. In addition, as also shown in FIG. 14A a time stamp may be associated with the event. In the example shown in FIG. 14A, the transaction in time 1402 may be associated with a "13:01" timestamp. For example, accumulator 348 may register the modification of the state variable with a timestamp or callback to delete its influence in the state variable when it expires.

The state variable may be updated again in time 1406, when service system 105 receives a second transaction event associated with the same account. The second transaction may be of $60,000. Accumulating the first transaction (in time 1402) and the second transaction (in time 1406), result in an accumulated value for the state variable of $90,000. This accumulation of the variable, focusing on differential changes rather than absolute values, minimize the number of calculations required to process events in real-time. Further, because single values are faster to compute, the state variable facilitates employing O(1) algorithms to update, monitor, or analyze state variables.

The state variable may be updated again in time 1410 when the first event expires. Because this state variable was configured with a 30 min time window, after 30 min passed from the first event (in time 1402), service system 105 may eliminate the influence of the event. Thus, in time 1410 the value of state variable may decrease from $90,000 to $60,000 because the influence of the first event (with a value of $30,000) expired after 30 min. In time 1414 a second event may expire. While the exemplary embodiment of FIG. 14A shows a callback time for the event at time 1402 of 30 min, other callback times may be implemented based on characteristics of system 100. Further computation triggered by new events and callback may be sufficient to identify abnormal or fraudulent behavior because it creates an internal rule engine that can utilize existing variables to make real-time decisions with fast determinations. For example, the computation triggered by new events and callback are sufficient because 99.9 percentile of the variable calculation speed may be within 20 milliseconds.

In some embodiments, as shown in FIG. 14A the expiration may be automatic. That is, as soon as an event expires the state variable is modified. However, to save computer resources and improve how the computer works, in other embodiments the state variable may only be updated if there is a triggering event. In such embodiments when a triggering event is received by service system 105 may first evaluate whether any event for the variable to be modified has expired, remove the influence of the expired events, and then modify the variable based on the triggering event. This arrangement, further described in connection with FIG. 14B, may minimize the number of calculations and access to memory.

The state variable may be updated a fourth time when the second event expires. In time 13:45, the second event expired because it is no longer on the time window of 30 min. Thus, system service 105 may remove the influence of the second event and the state variable returns to a value of $0 because the first and second event expired.

The arrangement for a state variable as depicted in FIG. 14A allows the accumulation of a series of events over a period of time. Similar state variables may be implemented for different keys that are extracted from events. For example, other state variables may be used to monitor transaction frequency. Moreover, while the state variable in FIG. 14A stores quantitative information, other state or accumulation variables may store qualitative information, such as location of transactions or include binary variables that change between, for example, active and inactive accounts.

FIG. 14A further shows a threshold 1420. When a variable exceeds the predetermined threshold, an alert may be generated to indicate abnormal behavior or potential fraud. For example, in FIG. 14A the state variable overcame threshold 1420 with the triggering event in time 1406. At this time, the accumulated amount state variable indicates that the account is being associated with rapid or high price transactions. In such embodiments, real-time state calculator 120 (FIG. 3) may generate an alert (with for example fraud/risk detection service 344) that may be used to prevent any further transactions in the account. For example, at time 1406 because the accumulated value exceed threshold 1420, client request interface 130 (FIG. 4) may be instructed to decline any further transactions from the account associated with the state variable. Alternatively, or additionally, as further described in connection to FIG. 9, the state variable exceeded threshold 1420 may be an input for a predictive model that uses multiple state variables to make a prediction or assess a fraud probability. In such embodiments, service system 105 may determine whether the prediction from the model is above a probability threshold.

Figure 14B:
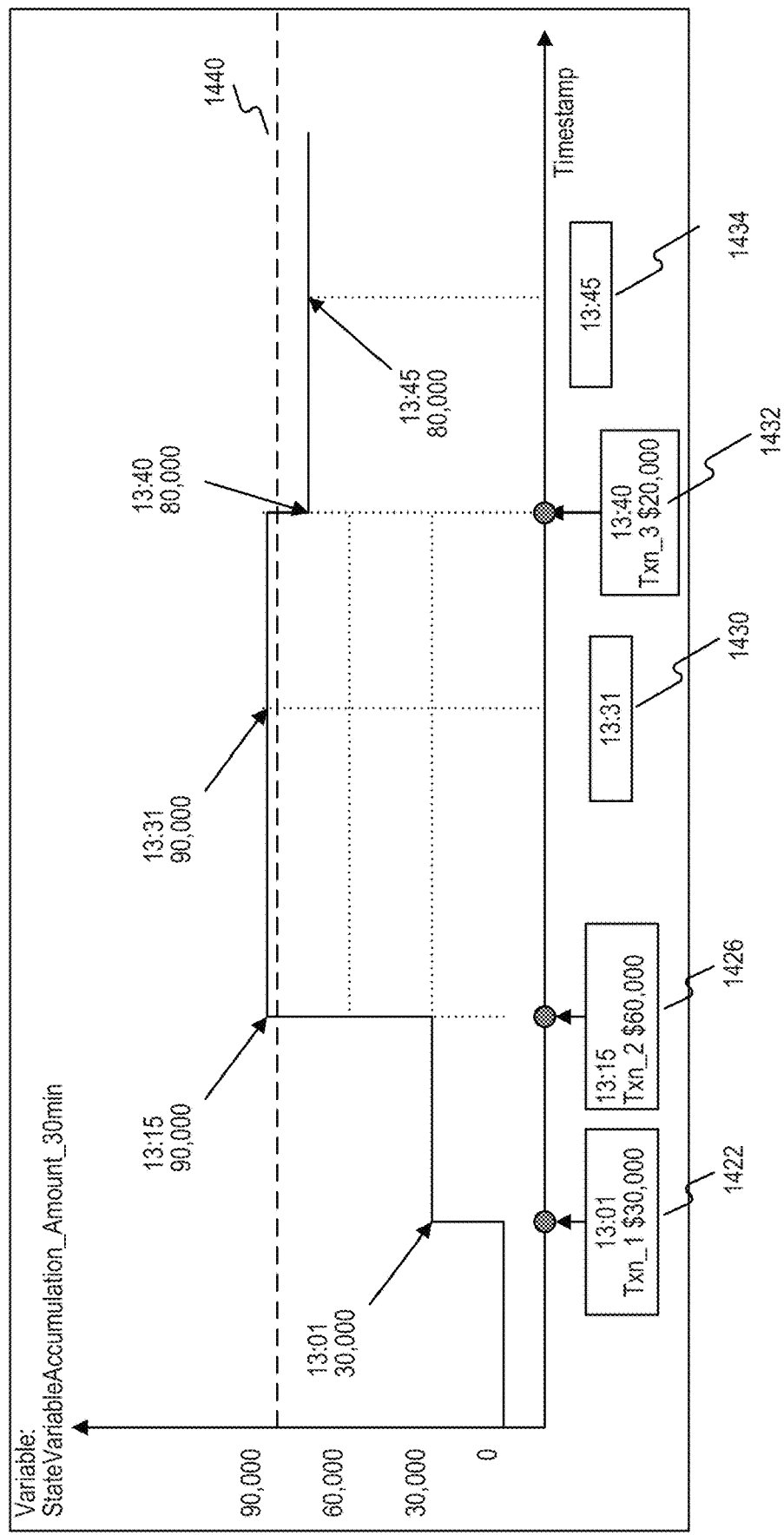
FIG. 14B is an exemplary graph of the value of a second exemplary state variable as a function of time, according with disclosed embodiments.

FIG. 14B shows a graph of the value of an exemplary second state variable as a function of time, according with disclosed embodiments. Similar to the state variable described in FIG. 14A, the state variable depicted in FIG. 14B may be configured to accumulate transaction value (e.g., the amount spent in a transaction) and remove the influence of events when they are older than 30 mins. However, unlike the state variable in FIG. 14A, the state variable of FIG. 14B may be configured to only update the variable when there is a triggering event.

Similar to FIG. 14A, the state variable in FIG. 14B shows that the state variable changes two times based on triggering events of first and second transactions in times 1422 and 1426. When the first event expires in time 1430, however, the state variable does not change because there has not been a triggering event. Accordingly, to minimize memory utilization and number of calculations, service system 105 does not update the state variable immediately when one of the events expired. Therefore, in time 1430 the value of the state variable does not change, even though the first event already expired.

The state variable, instead, is updated when there is a third triggering event in time 1432. In time 1432 service system 105 may receive a third transaction with an amount of $20,000. In updating the state variable, service system 105 may notice that the first event has already expired. Thus, updating state variable at time 1432 may include removing expired events and adding new events. In the example of FIG. 14B updating the event includes removing the $30,000 influence from the first event and adding the $20,000. Thus the state variable has a net decrease of $10,000 at time 1432.

Further, at time 1434, even though the second event expired, the state variable does not change because there has not been a triggering event. With this arrangement each event is involved in two calculations, one when it is accumulated and one when the event expires. However, the accumulation and expiration operations are batched to influence the variable only when there is a triggering event.

FIG. 14B also shows a threshold 1440, which like in FIG. 14A was exceeded with the second transaction, triggering an alert that may impede additional transactions with the account.

Figure 14C:
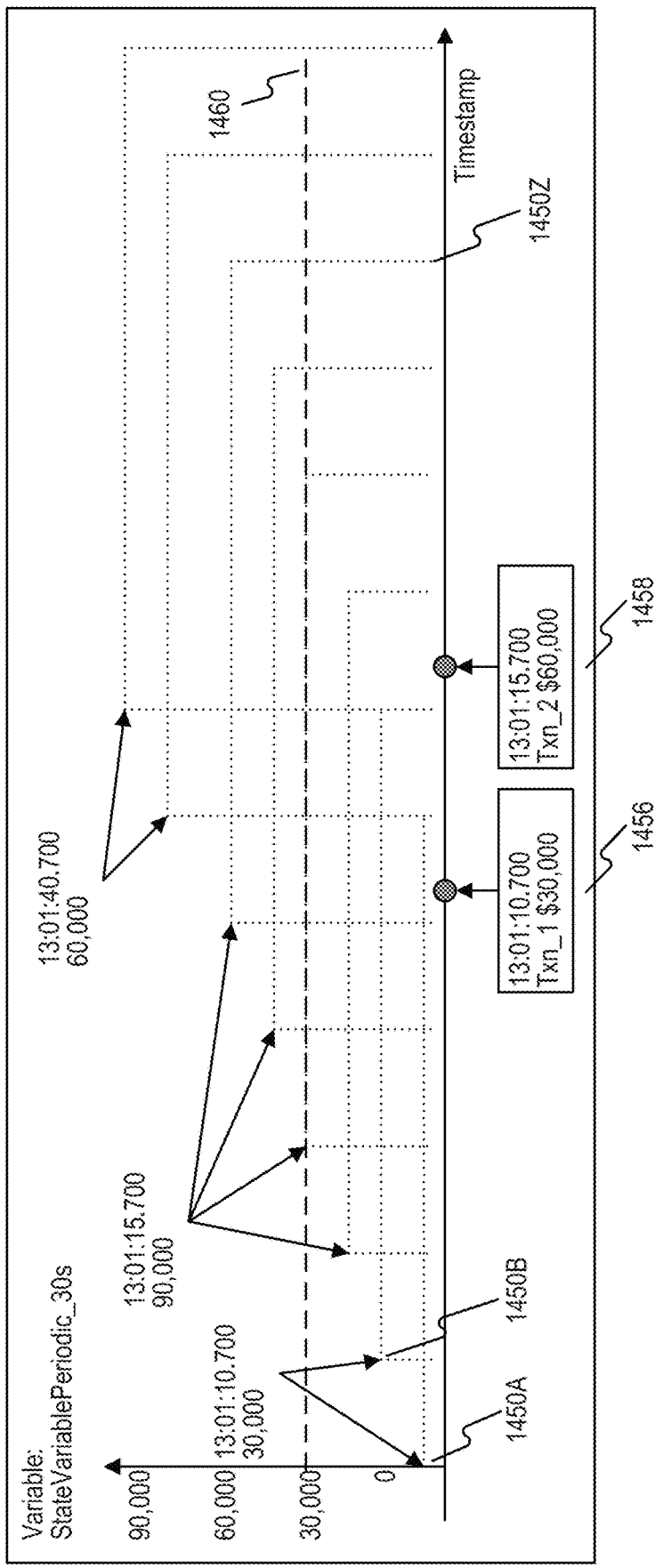
FIG. 14C is an exemplary graph of the value of a third exemplary state variable as a function of time, according with disclosed embodiments.

FIG. 14C shows a graph of the value of an exemplary third state variable as a function of time, according with disclosed embodiments. Unlike state variables described in FIGS. 14A-14B, the state variable depicted in FIG. 14C has a periodic monitoring, instead of accumulation. This type of variable may be used when it is desired to apply a comprehensive computation considering all events within the window being assessed for fraud and/or considering available historical information. It may be implemented using Flink® or Spark® and it may be used on fixed-length windows, or intervals, in which the variable is monitored to determine its status.

FIG. 14C shows the variable is monitored every interval 1450 (1450 A-1450Z). In each interface, service system 105 may evaluate the status of the variable to determine if it has exceeded threshold 1460. Triggering events are independent of the modifications to the variable, which instead monitor each event individually to determine abnormality. For example, when a first transaction arrives to service system 105 in time 1456, service system may add the event and its information to the state variable. Then, when in time 1458 a new event reaches service system 105, there is no accumulation of the amounts. Rather, service system 105 may apply a comprehensive computation including each one of the events separately and evaluating historic trends.

While this approach may provide continuous approximations and permanent monitoring of accounts, it may utilize memory frequently and use more computational resources. Thus, in some embodiments, non-accumulation state variables as shown in FIG. 14C may only be used for specific keys of critical importance.

Figure 15:
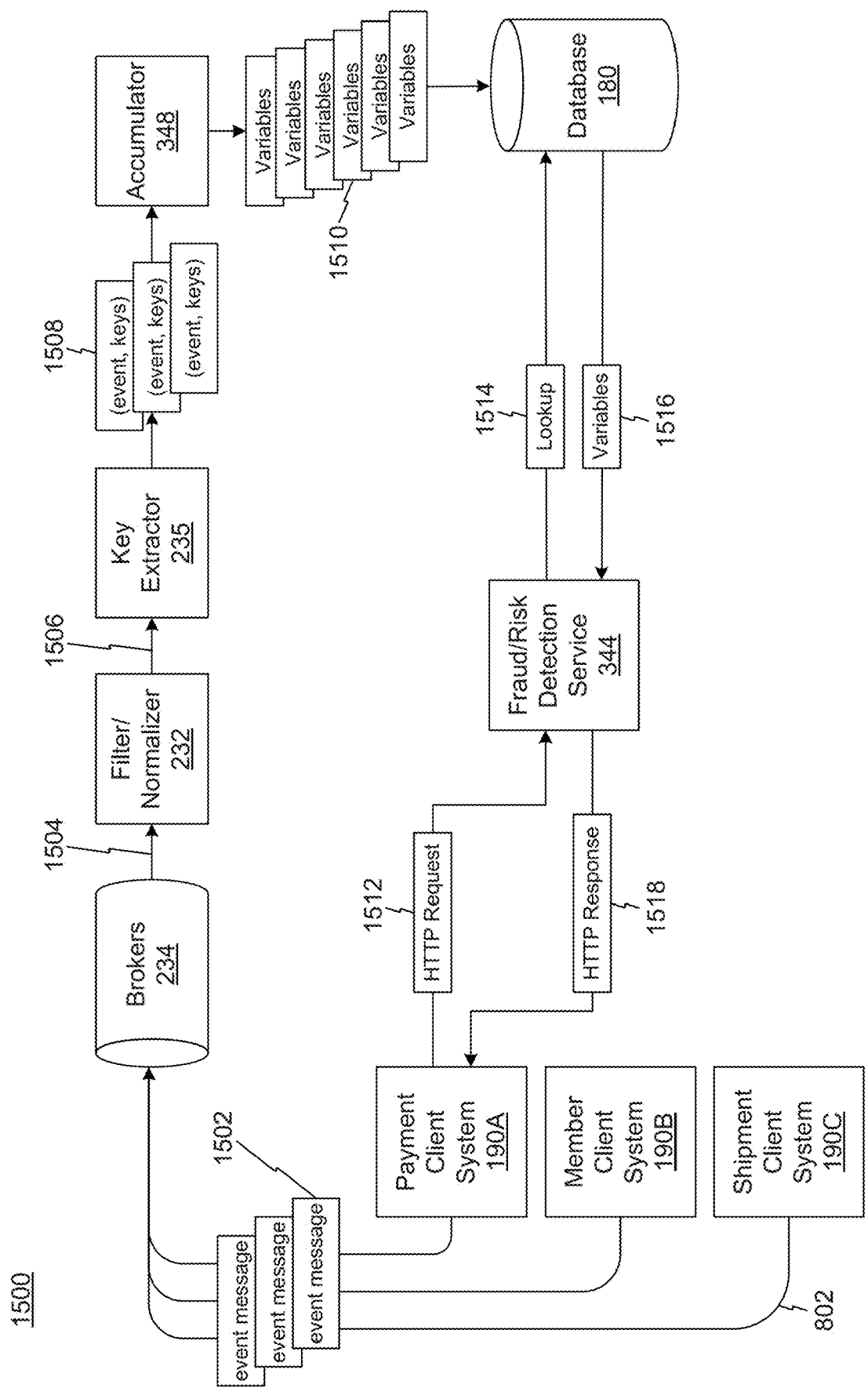
FIG. 15 is an exemplary process flow diagram illustrating pipeline data stream processing, consistent with disclosed embodiments.

Referring now to FIG. 15, there is shown a process flow diagram illustrating pipeline data stream processing flow 1500, consistent with disclosed embodiments. In some embodiments, as shown in FIG. 15, different elements of system 100 (FIG. 1) may perform specific steps of flow 1500. For example, components of service system 105 may perform one or more steps but other systems, such as client systems 190, may perform other steps. In other embodiments, however, alternative elements of system 100 may perform the described steps or a single element of system 100 may perform one or more of the described steps.

In step 1502, client system 190 may transmit event messages to service system 105. For example, a payment client system 190A, a member client system 190B, and a shipment client system 190C, may send event messages to service system 105 in step 1502. In some embodiments, the messages may be received concurrently without a predicted schedule. However, in other embodiments, the messages may be received in batches and according to some predetermined scheduled.

In step 1504, brokers 234 (FIG. 2) may accept event messages as data streams and emit sorted data streams when requested. In step 1506, filter/normalizer 232 (FIG. 2) may process streams for brokers 234 to modify event messages or discard event messages according to filter or normalization rules. In step 1508, key extractor 235 (FIG. 2) may generate even/key pairs based on event messages in the data streams. In step 1510, the event/key pairs may be processed by accumulator 348 (FIG. 3), which may provide or updated variables, such as state variables, and store them in databases 180. In some embodiments, key extractor 234 may work closely with accumulator 344 by dispatching the events to specific accumulator 348 instances. To maximize processing speed of the real-time data streams, key extractor 235 may map instances of accumulators and their respective servers/JVMs/Threads. Key extractor 235 may determine which accumulator 348 instance an event to send to minimize latency and improve response times.

The variables by accumulator 348 may then be used by fraud/risk detection service 344 when making determinations of abnormality in data streams. For example, in step 1512 client systems 190 may send an HTTP request (e.g., payment client system 190A may send a request payment to service system 105). The request may be received by fraud/risk detection service 344 which may, in turn, request variables associated with the HTTP request from databases 180 in step 1514. In step 1516, database 180 may return variables to fraud/risk detection service 344, which may implement prediction models and/or rules to determine whether the HTTP request should be accepted or not. In step 1518, based on variables of step 816, fraud/risk detection service 344 may transmit an HTTP response.

Figure 16:
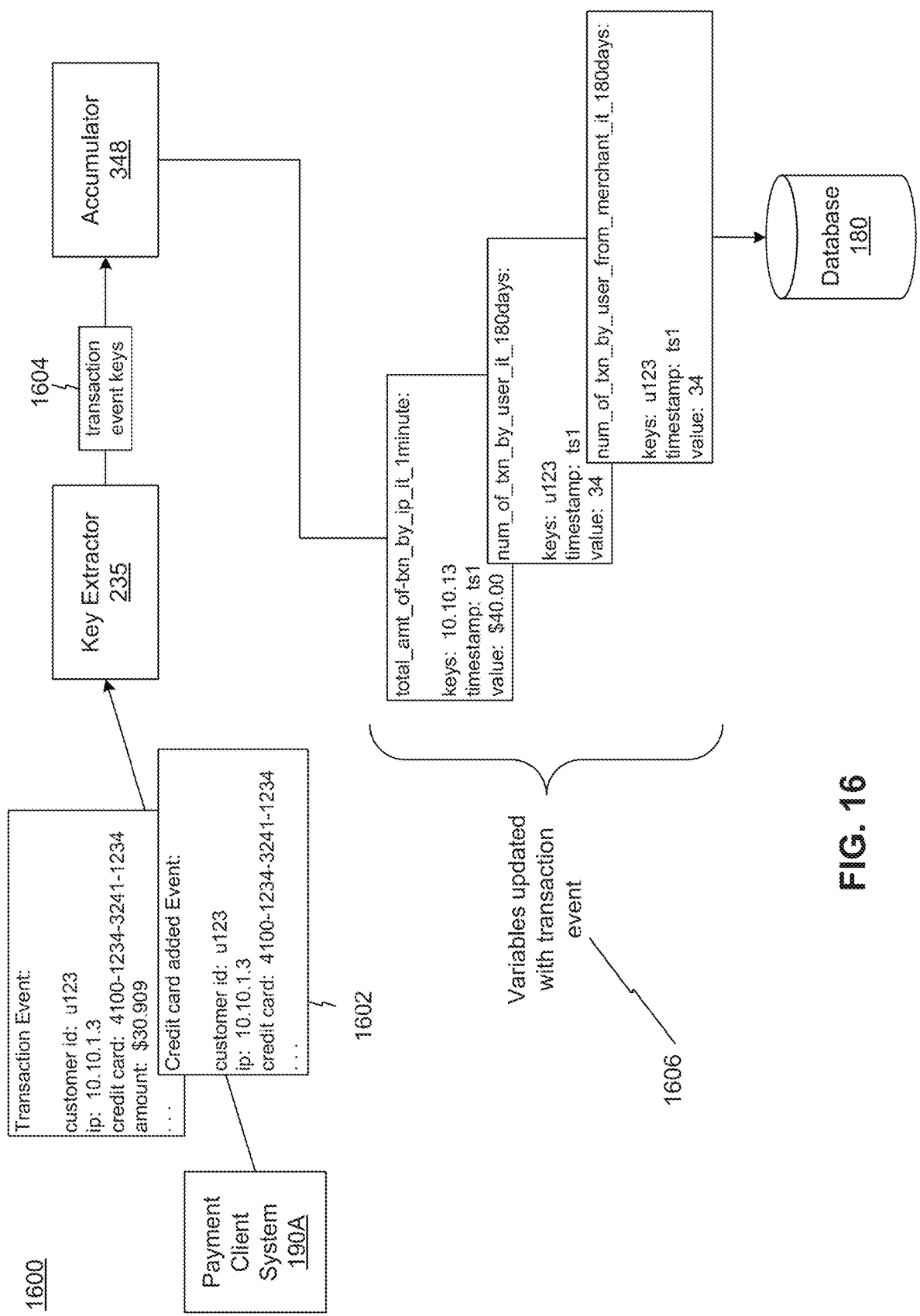
FIG. 16 is an exemplary process flow diagram illustrating state variable updates based on transaction events, consistent with disclosed embodiments.

Referring now to FIG. 16, there is shown a process flow diagram illustrating state variable updates based on transaction events, consistent with disclosed embodiments. In some embodiments, as shown in FIG. 16, different elements of system 100 (FIG. 1) may perform specific steps of flow 1600. For example, components of service system 105 may perform one or more steps but other systems, such as client systems 190, may perform other steps. In other embodiments, however, alternative elements of system 100 may perform the described steps or a single element of system 100 may perform one or more of the described steps.

In step 1602 client system 190 may send event messages including transaction events. For example, payment client system 190A may send transaction events including a customer ID, and IP address, a credit card number, a merchant ID, and an amount. In step 1604, key extractor 235 (FIG. 2) may generate a data stream with event/key pairs for the transaction event. Based on the key/pair events, accumulator 348 may update variables based on the transaction events of step 1602. For example, in step 1606 accumulator 348 may update state variables tracking amount or number of transactions based on transaction event/key pairs. Accumulator 348 may also store the updated state variables in databases 180.

Figure 17:
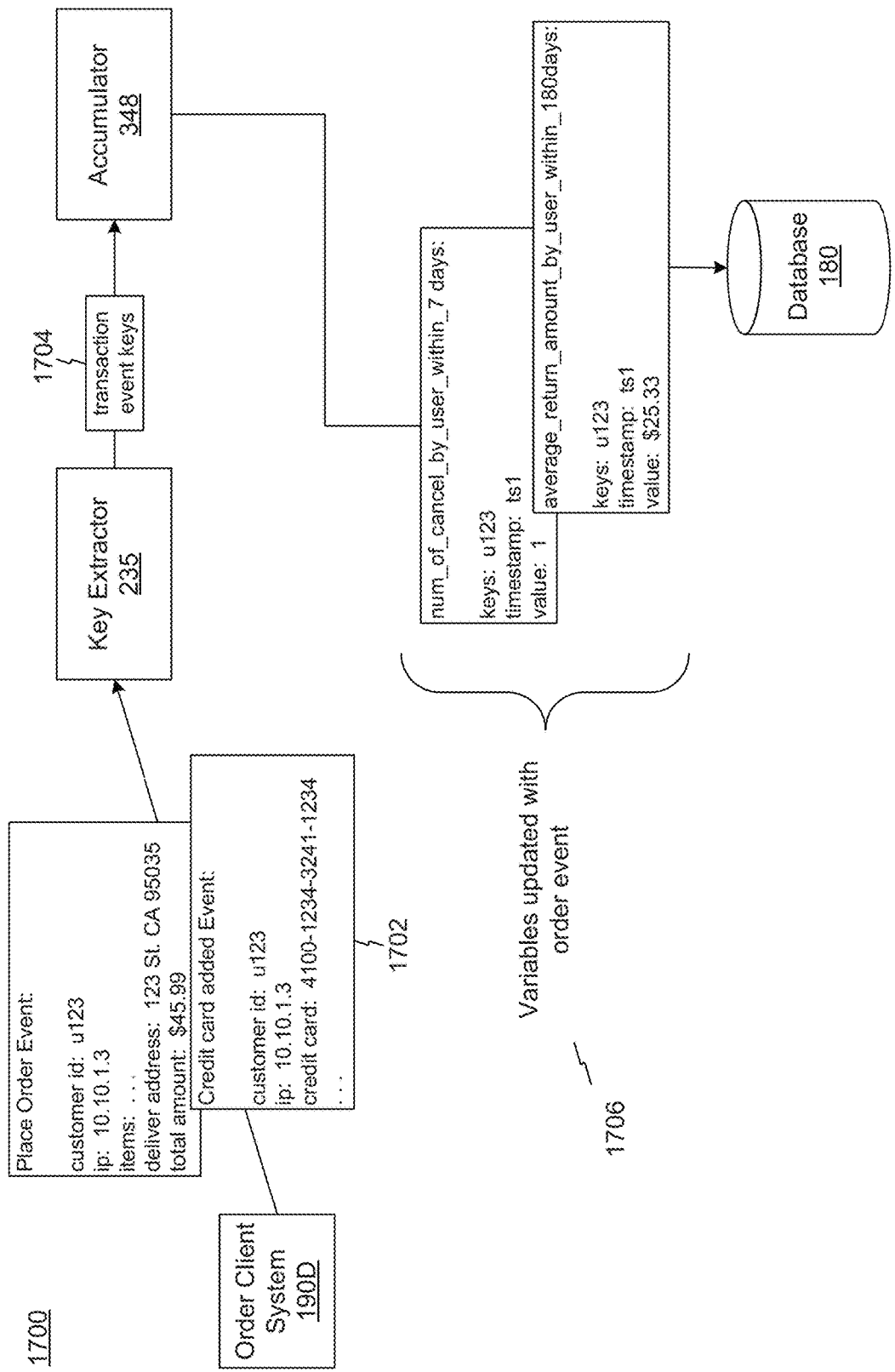
FIG. 17 is an exemplary process flow diagram illustrating state variable updates based on order events, consistent with disclosed embodiments.

Referring now to FIG. 17, there is shown a process flow diagram illustrating state variable updates based on transaction events, consistent with disclosed embodiments. In some embodiments, as shown in FIG. 17, different elements of system 100 (FIG. 1) may perform specific steps of flow 1700. For example, components of service system 105 may perform one or more steps but other systems, such as client systems 190, may perform other steps. In other embodiments, however, alternative elements of system 100 may perform the described steps or a single element of system 100 may perform one or more of the described steps.

In step 1702 client system 190 may send event messages including order events. For example, an order client system 190D may send place order events and/or cancel order events. The order events may include a customer ID, and IP address, an item identification, client information, and an amount. In step 1704, key extractor 1004 may generate a data stream with event/key pairs for the order event. Based on the key/pair events, accumulator 348 (FIG. 3) may update variables based on the order events of step 1702. For example, in step 1706 accumulator 348 may update state variables tracking amount or number of transactions based on order event/key pairs. Accumulator 348 may also store the updated state variables in databases 180.

In some embodiments, flows 1600 and 1700 may be performed in parallel, updating state variables related to both transaction and order events concurrently.

Figure 18:
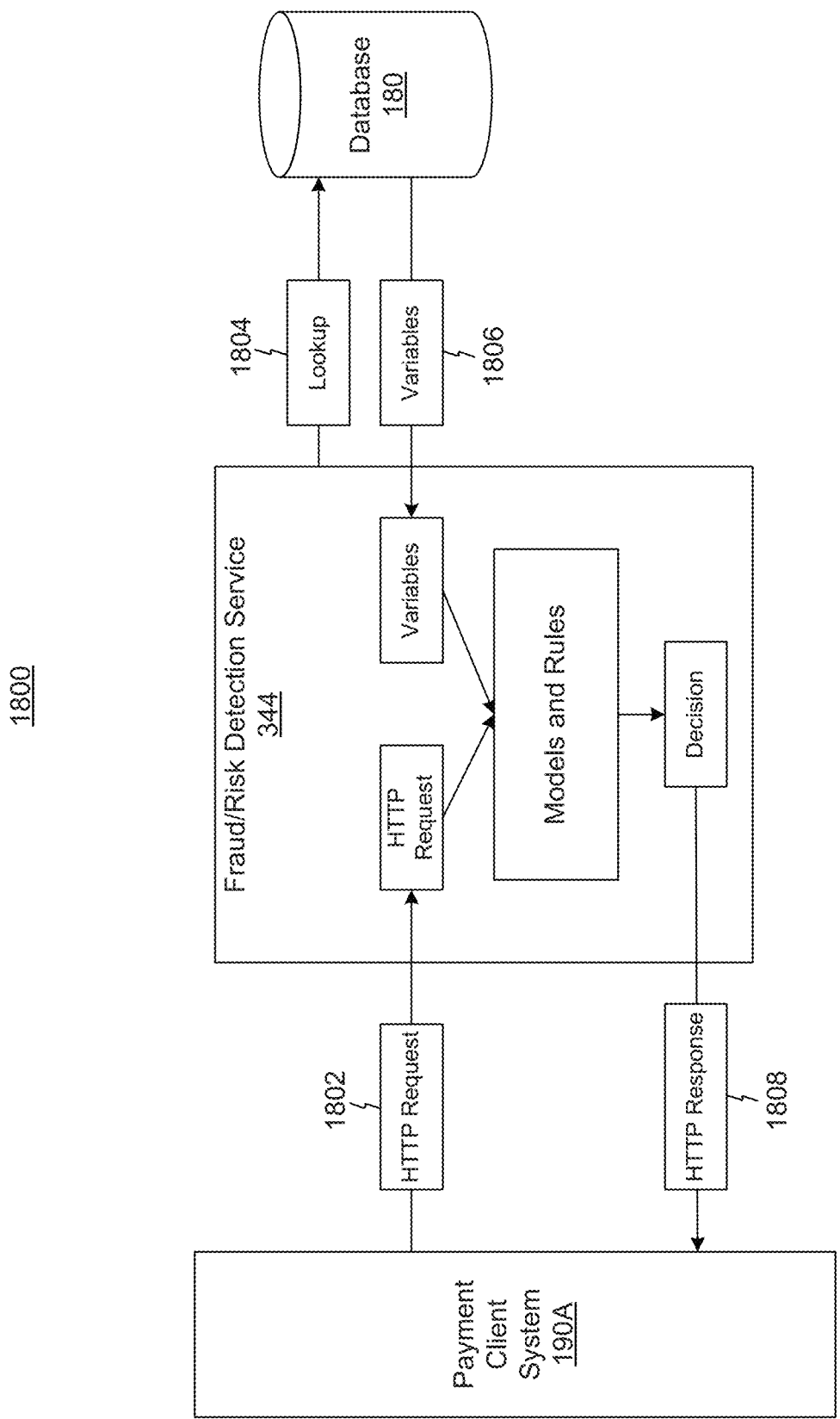
FIG. 18 is an exemplary process flow diagram illustrating alert processing, consistent with disclosed embodiments.

Referring now to FIG. 18, there is shown a process flow diagram illustrating an alert processing flow, consistent with disclosed embodiments. In some embodiments, as shown in FIG. 18, different elements of system 100 (FIG. 1) may perform specific steps of flow 1800. For example, components of service system 105 may perform one or more steps but other systems, such as client systems 190, may perform other steps. In other embodiments, however, alternative elements of system 100 may perform the described steps or a single element of system 100 may perform one or more of the described steps.

In step 1802 client system 190 may send an HTTP request to service system 105. For example, payment client system 190A may send an HTTP request for a transaction to service system 105. The HTTP request may be a transmitted using an API such as REST API. In step 1804, fraud/risk detection service 344 may request variables from databases 180 using a lookup command. For example, as previously discussed in connection with FIGS. 16-17, accumulator 348 may calculate and store state variables in databases 180. In step 1804, fraud/risk detection service 344 may request the variables from databases 180, which may return the relevant variables for the HTTP request in step 1106.

Fraud/risk detection service 344 may use models and/or prediction rules, as further described in connection to FIGS. 12-13, to determine a response based on the variables received in step 1806. In step 1808, fraud/risk detection service 344 may transmit the response to client systems 190. The response may be based on state variables, models and rules stored in fraud/risk detection service 344, and the information provided in the HTTP request.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted. Furthermore, while some of the exemplary embodiments of the computerized methods were described using Java language to illustrate exemplary scripts and routines, the disclosed methods and systems may be implemented using alternative languages. The disclosed embodiments may use one or multiple programming languages in addition to Java. For example, the disclosed embodiments may also be implemented using Python, C, C++, C#, R, Go, Swift, Ruby, and/or their combinations.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system for generating alerts, comprising:
   one or more processors; and
   one or more storage devices storing instructions that, when executed, configure the one or more processors to perform operations comprising:
   receiving an event from a data stream, the event comprising transaction information;
   extracting keys from the event based on a group of pre-defined selected topics;
   associating the event with at least one account based on the extracted keys;
   identifying, in an array comprising a plurality of state variables, one or more state variables associated with the at least one account, the plurality of state variables being configured to be accessed with a constant time complexity, each of the plurality of state variables accumulating values proportional to transaction amounts of events and registering time stamps for each of the events;
updating the array by:
  accumulating the event in the one or more state variables by adding an influence of the event to the one or more state variables, the influence of the event being proportional to a transaction amount associated with the event;
  registering a time stamp for the event; and
  retiring expired events from the plurality of state variables by subtracting influence of events associated with time stamps outside an influence window;
after updating the array, determining whether at least one of the plurality of state variables is above a threshold level;
computing a probability of fraud based on weighted state variables using a predictive model, weights of the weighted state variables being based on the extracted keys; and
generating an alert signal in response to determining the probability of fraud is above a probability threshold or at least one of the plurality of state variables is above the threshold level.

2. The system of claim 1, wherein associating the event with the at least one account comprises:
  retrieving from a non-relational database a lookup table associating keys with accounts; and
  identifying an account in the lookup table that is correlated with one or more of the extracted keys.

3. The system of claim 1, wherein
  the operations further comprise determining a length of time for the influence window; and
  retiring expired events comprises:
  deleting existing events associated with time stamps older than a lower bound of the influence window.

4. The system of claim 3, wherein
  a single copy of the array is stored in a single memory unit; and
  the time window is of 24 hours.

5. The system of claim 1, wherein
  the operations further comprise extracting values from the event;
  the extracted keys include at least one of an IP address, an email address, or a phone number; and
  the extracted values include a transaction value.

6. The system of claim 5, wherein accumulating the event in the one or more state variables further comprises registering a callback for the influence associated with the event.

7. The system of claim 1, wherein the operations further comprise:
  receiving a transaction request from an API interfacing client systems;
  identifying an account associated with the transaction request;
  declining the transaction request when an alert has been generated for the account.

8. The system of claim 1, wherein
  receiving an event from a data stream comprises receiving a plurality of events from multiple client systems; and
  extracting keys from the event comprises: configuring one or more stream capture applications; assigning one or more brokers to each capture application; and defining in each broker to convert event information into variables accessible with O(1) operators.

9. The system of claim 1, wherein receiving the event comprises:
  identifying events that do not include an associated event time;
  deleting events without associated event time; and
  normalizing event information of undeleted events by normalizing time zone of event times and currency of the events.

10. The system of claim 1, wherein the predictive model comprises a convolutional neural network determining probability of fraudulent activity.

11. The system of claim 10, wherein the operations further comprise: after generating the alert signal, assigning the event as training dataset or validation dataset;
  transmitting the event data to a modeling API for a training microservice; and
  updating the convolutional neural network when the training microservice finds a user-defined accuracy is achieved.

12. A computer-implemented method for generating alerts, the method comprising:
  receiving an event from a data stream, the event comprising transaction information;
  extracting keys from the event based on a group of pre-defined selected topics;
  associating the event with at least one account based on the extracted keys;
  identifying, in an array comprising a plurality of state variables, one or more state variables associated with the at least one account, the plurality of state variables being configured to be accessed with a constant time complexity, each of the plurality of state variables accumulating values proportional to transaction amounts of events and registering time stamps for each of the events;
  updating the array by:
    accumulating the event in the one or more state variables by adding an influence of the event to the one or more state variables, the influence of the event being proportional to a transaction amount associated with the event;
    registering a time stamp for the event; and
    retiring expired events from the plurality of state variables by subtracting influence of events associated with time stamps outside an influence window;
  after updating the array, determining whether at least one of the plurality of state variables is above a threshold level;
  computing a probability of fraud based on weighted state variables using a predictive model, weights of the weighted state variables being based on the extracted keys; and
  generating an alert signal in response to determining the probability of fraud is above a probability threshold or at least one of the plurality of state variables is above the threshold level.

13. The method of claim 12, wherein associating the event with the at least one account comprises:
  retrieving from a non-relational database a lookup table associating keys with accounts; and
  identifying an account in the lookup table that is correlated with one or more of the extracted keys.

14. The method of claim 12, further comprising determining a length of time for the influence window; and
  wherein retiring expired events comprises:
  deleting existing events associated with time stamps older than a lower bound of the influence window.

15. The method of claim 14, wherein
a single copy of the array, is stored in a single memory unit; and
the time window is of 24 hours.

16. The method of claim 12, further comprising:
extracting a transaction value associated with the event; and
wherein the extracted keys include at least one of an IP address, an email address, a phone number.

17. The method of claim 16, wherein accumulating the event in the one or more state variables further comprises registering a callback for the influence of the event.

18. The method of claim 12, further comprising:
receiving a transaction request from an API interfacing client systems;
identifying an account associated with the transaction request; and
declining the transaction request when an alert has been generated for the account.

19. The method of claim 12, wherein
receiving an event from a data stream comprises receiving a plurality of events from multiple client systems; and
extracting keys from the event comprises:
configuring one or more stream capture applications;
assigning one or more brokers to each capture application; and
defining in each broker to convert event information into variables accessible with O(1) operators.

20. A non-transitory computer-readable medium storing instructions that, when executed by a processor, perform operations to generate real-time alerts based on transactions comprising:
receiving, from a plurality of client systems, a data stream comprising a plurality of events;
filtering out events from the plurality of events that do not include a time stamp;
generating an array of normalized events by normalizing time zone and currency in each one of the non-filtered events;
extracting in real-time a plurality of keys from the normalized events, the plurality of keys comprising IP address, email address, or phone number;
associating the normalized events with at least one account based on corresponding keys;
identifying, in an array comprising a plurality of state variables, one or more state variables associated with corresponding accounts, the plurality of state variables being configured be accessed with O(1) complexity operators, each of the plurality of state variables accumulating values proportional to transaction amounts of events and registering time stamps for each of the events;
updating the array by:
accumulating the non-filtered events in the one or more state variables by adding influence of the events to the one or more state variables, the influence of the events being proportional to transaction amounts associated with the events;
registering a timer and a callback for each one of the events; and
retiring expired events from the plurality of state variables by subtracting influence of events associated with time stamps outside an influence window;
after updating the array, determining whether at least one of the plurality of state variables is above a threshold level:
computing a probability of fraud based on weighted state variables using a predictive model weights of the weighted state variables being based on the extracted keys; and
generating an alert in response to determining the probability of fraud is above the threshold level or at least one of the plurality of state variables is above the threshold level.

* * * * *